US012794114B2

(12) United States Patent
Park et al.

(10) Patent No.: US 12,794,114 B2

(45) **Date of Patent: *Nov. 10, 2026**

(54) ELECTRONIC DEVICE COMPRISING ANTENNA

(71) Applicant: Samsung Electronics Co., Ltd., Suwon-si (KR)

(72) Inventors: Seongjin Park, Suwon-si (KR); Bumjin Cho, Suwon-si (KR); Yoonjung Kim, Suwon-si (KR); Hosaeng Kim, Suwon-si (KR); Jaehoon Jo, Suwon-si (KR); Jinwoo Jung, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 26 days.

This patent is subject to a terminal disclaimer.

(21) Appl. No.: 18/908,131

(22) Filed: Oct. 7, 2024

(65) Prior Publication Data

US 2025/0105494 A1 Mar. 27, 2025

Related U.S. Application Data

(63) Continuation of application No. 17/994,233, filed on Nov. 25, 2022, now Pat. No. 12,113,270, which is a (Continued)

(30) Foreign Application Priority Data

Jun. 10, 2021 (KR) ........................ 10-2021-0075516

(51) Int. Cl.

*H01Q 1/24* (2006.01)
*H01Q 9/04* (2006.01)
*H01Q 25/00* (2006.01)

(52) U.S. Cl.

CPC ........... *H01Q 1/243* (2013.01); *H01Q 9/0407* (2013.01); *H01Q 25/00* (2013.01)

(58) Field of Classification Search

None

See application file for complete search history.

(56) References Cited

U.S. PATENT DOCUMENTS 10,297,900 B2 5/2019 Lee et al.
10,455,065 B2 10/2019 Lee et al.
(Continued)

FOREIGN PATENT DOCUMENTS

KR 10-1283070 B1 7/2013
KR 10-2017-0083949 A 7/2017
(Continued)

OTHER PUBLICATIONS

Korean Office Action dated Jul. 1, 2025, issued in a Koean Patent Application No. 10-2021-0075516.
(Continued)

*Primary Examiner* — Wilson Lee

(74) *Attorney, Agent, or Firm* — Jefferson IP Law, LLP

(57) ABSTRACT

An electronic device is provided. The electronic device includes a first frame, a first opening formed in one area of the first frame, a first antenna that includes a first printed circuit board including first conductive patches, a first dielectric material that is disposed in the first opening and has a first dielectric constant, a second dielectric material disposed between the first dielectric material and the first conductive patches, and a wireless communication circuit that is electrically connected to the first antenna, wherein the second dielectric material may have a second dielectric constant that is lower than the first dielectric constant of the first dielectric material, and the wireless communication circuit may be configured to feed power to the first conduc- (Continued)

tive patches to transmit and/or receive a signal in a frequency band of 10 gigahertz (GHz) or higher.

20 Claims, 21 Drawing Sheets

Related U.S. Application Data continuation of application No. PCT/KR2022/008251, filed on Jun. 10, 2022.

(56) References Cited

U.S. PATENT DOCUMENTS 10,522,900 B2 12/2019 Khripkov et al.
10,658,724 B2 5/2020 Kim et al.
10,854,761 B1 12/2020 Lee et al.
11,133,595 B2 9/2021 Park et al.
11,228,105 B2 1/2022 Yun et al.
12,113,270 B2* 10/2024 Park ........................ H01Q 25/00
2002/0070901 A1* 6/2002 Sakota .................... H01Q 23/00
343/700 MS
2010/0073247 A1 3/2010 Arkko et al.
2017/0352944 A1 12/2017 Komulainen et al.
2018/0166788 A1 6/2018 Pan et al.
2018/0311428 A1* 11/2018 Griessmann ........... G16H 40/63
2019/0165473 A1 5/2019 Yun et al.
2019/0326672 A1 10/2019 Lim et al.
2020/0212542 A1 7/2020 Yong et al.
2020/0212569 A1 7/2020 Kumar et al.
2020/0227821 A1 7/2020 Wu et al.
2020/0295789 A1 9/2020 Ouyang et al.
2020/0313299 A1 10/2020 Jia
2020/0328521 A1* 10/2020 Rogers ................. H01Q 9/0442
2020/0328530 A1 10/2020 Park et al.
2020/0335870 A1 10/2020 Kim et al.
2020/0411954 A1 12/2020 Jia
2021/0075115 A1* 3/2021 Kim ........................ H01Q 1/243
2021/0249751 A1* 8/2021 Lee ....................... H01Q 1/2283
2021/0298174 A1 9/2021 Lee et al.
2021/0320417 A1 10/2021 Lee et al.
2021/0328362 A1 10/2021 Park et al.
2022/0109464 A1 4/2022 Avser et al.
2022/0216613 A1 7/2022 Jeon
2022/0336965 A1* 10/2022 Compton ................. H01Q 3/26
2022/0393365 A1* 12/2022 Wu ......................... H01Q 5/385
2023/0299502 A1* 9/2023 Woo ......................... H01Q 9/16
343/702
2023/0411869 A1* 12/2023 Jang ........................ H01Q 5/378

FOREIGN PATENT DOCUMENTS

KR 10-2019-0038264 A 4/2019
KR 10-1983552 B1 5/2019
KR 10-2019-0061795 A 6/2019
KR 20190105546 A * 9/2019 ............ H10W 42/00
KR 10-2020-0061178 A 6/2020
KR 10-2020-0081760 A 7/2020
KR 10-2021-0043321 A 4/2021
WO 2018/206116 A1 11/2018
WO 2020/032529 A1 2/2020

OTHER PUBLICATIONS

Shavit Reuven, Sandwich Radomes, Radome Electromagnetic Theory and Design, Apr. 10, 2018, XP055872732.
European Search Report dated Jul. 24, 2024, issued in European Application No. 22820616.5.
European Office Action dated Feb. 6, 2026, issued in a European Patent Application No. 22820616.5.
Korean Notice of Patent Grant dated Feb. 11, 2026, issued in a Korean Patent Application No. 10-2021-0075516.

* cited by examiner

ELECTRONIC DEVICE COMPRISING ANTENNA

CROSS-REFERENCE TO RELATED APPLICATION(S)

This application is a continuation application of prior application Ser. No. 17/994,233, filed on Nov. 25, 2022, which has issued as U.S. Pat. No. 12,113,270 on Oct. 8, 2024 and is a continuation application, claiming priority under § 365(c), of an International application No. PCT/KR2022/008251, filed on Jun. 10, 2022, which is based on and claims the benefit of a Korean patent application number 10-2021-0075516, filed on Jun. 10, 2021, in the Korean Intellectual Property, the disclosure of which is incorporated by reference herein in its entirety.

BACKGROUND ART

Field

The disclosure relates to an electronic device including an antenna.

Description of Related Art

With the development of communication devices, electronic devices may include an antenna module capable of fast and high-capacity transmission for producing and transmitting various contents, connecting the Internet with various things (e.g., Internet of Things (IoT)), or communication connection between various sensors for autonomous driving. For example, the electronic device may include an antenna module that radiates a millimeter wave (mmWave) signal (hereinafter, referred to as a "mmWave antenna module").

The mmWave antenna module may be disposed adjacent to the outer periphery of a frame that forms a side surface of the electronic device. For example, the electronic device may include two mmWave antenna modules disposed adjacent to a side surface of the electronic device to form a beam toward the side surface. As another example, an electronic device may include one mmWave antenna module disposed adjacent to a side surface of the electronic device to form a beam toward the side surface, and one mmWave antenna module disposed adjacent to a rear cover to form a beam toward the rear surface.

The above information is presented as background information only to assist with an understanding of the disclosure. No determination has been made, and no assertion is made, as to whether any of the above might be applicable as prior art with regard to the disclosure.

SUMMARY

Of a frame structure of an electronic device, a first frame may form a first side surface of the electronic device, and the first frame may include an opening provided in one area in order for a first antenna module to radiate a mmWave signal. In order for a signal having a horizontal polarization (e.g., polarization in the y-axis direction in FIG. 5C) characteristic, among mmWave signals radiated by the first antenna module, to pass through the opening, it may be necessary for the height of the opening to be greater than the length of a ½ wavelength of the mmWave signal. However, as electronic devices have recently become thinner, it may be difficult for an electronic device to secure a sufficient height of an opening for a mmWave signal to pass therethrough.

Aspects of the disclosure are to address at least the above-mentioned problems and/or disadvantages and to provide at least the advantages described below. Accordingly, an aspect of the disclosure is to an electronic device including a first dielectric material having a first dielectric constant and a second dielectric material having a second dielectric constant in an opening and a space between the opening and the first antenna module.

Additional aspects will be set forth in part in the description which follows and, in part, will be apparent from the description, or may be learned by practice of the presented embodiments.

In accordance with an aspect of the disclosure, an electronic device is provided. The electronic device includes a first frame forming a first side surface of the electronic device, a first opening formed in one area of the first frame, a first antenna that includes a first printed circuit board including first conductive patches disposed on one surface of the first printed circuit that faces the first opening, a first dielectric material that is disposed in the first opening and has a first dielectric constant, a second dielectric material disposed between the first dielectric material and the first conductive patches, and a wireless communication circuit that is electrically connected to the first antenna. The first antenna may be disposed in the electronic device to wirelessly radiate a signal toward the first opening of the first frame, the second dielectric material may have a second dielectric constant that is lower than the first dielectric constant of the first dielectric material, and the wireless communication circuit may be configured to feed power to the first conductive patches to transmit and/or receive a signal in a frequency band of 10 gigahertz (GHz) or higher.

In accordance with another aspect of the disclosure, an electronic device is provided. The electronic device includes a first frame forming a first side surface of the electronic device, a first opening that is provided in one area of the first frame, a first antenna that includes a first printed circuit board including first conductive patches disposed on one surface of the first printed circuit that faces the first opening, a first dielectric material that is disposed in the first opening and has a first dielectric constant, a second dielectric material disposed between the first dielectric material and the first conductive patches, a third dielectric material that has a third dielectric constant lower than the first dielectric constant of the first dielectric material, and a wireless communication circuit that is electrically connected to the first antenna. The first antenna may be disposed in the electronic device to wirelessly radiate a signal toward the first opening of the first frame, the second dielectric material may have a second dielectric constant that is lower than the first dielectric constant of the first dielectric material, and the third dielectric material is disposed in the first opening, and is positioned in a first direction from the first antenna toward the first opening with respect to the first dielectric material disposed in the first opening. The wireless communication circuit may be configured to feed power to the first conductive patches to transmit and/or receive a signal in a frequency band of 10 GHz or higher.

According to various embodiments disclosed herein, it is possible for the electronic device to improve an antenna gain and an antenna coverage by allowing an RF signal transmitted and/or received by a wireless communication circuit to pass through multiple dielectric materials having different dielectric constants.

Furthermore, according to various embodiments, it is possible to reduce the height of an opening for transmitting and/or receiving a mmWave signal in the electronic device by disposing the opening and the multiple dielectric materials between the opening and the antenna module.

In addition, various effects directly or indirectly identified through the disclosure may be provided.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
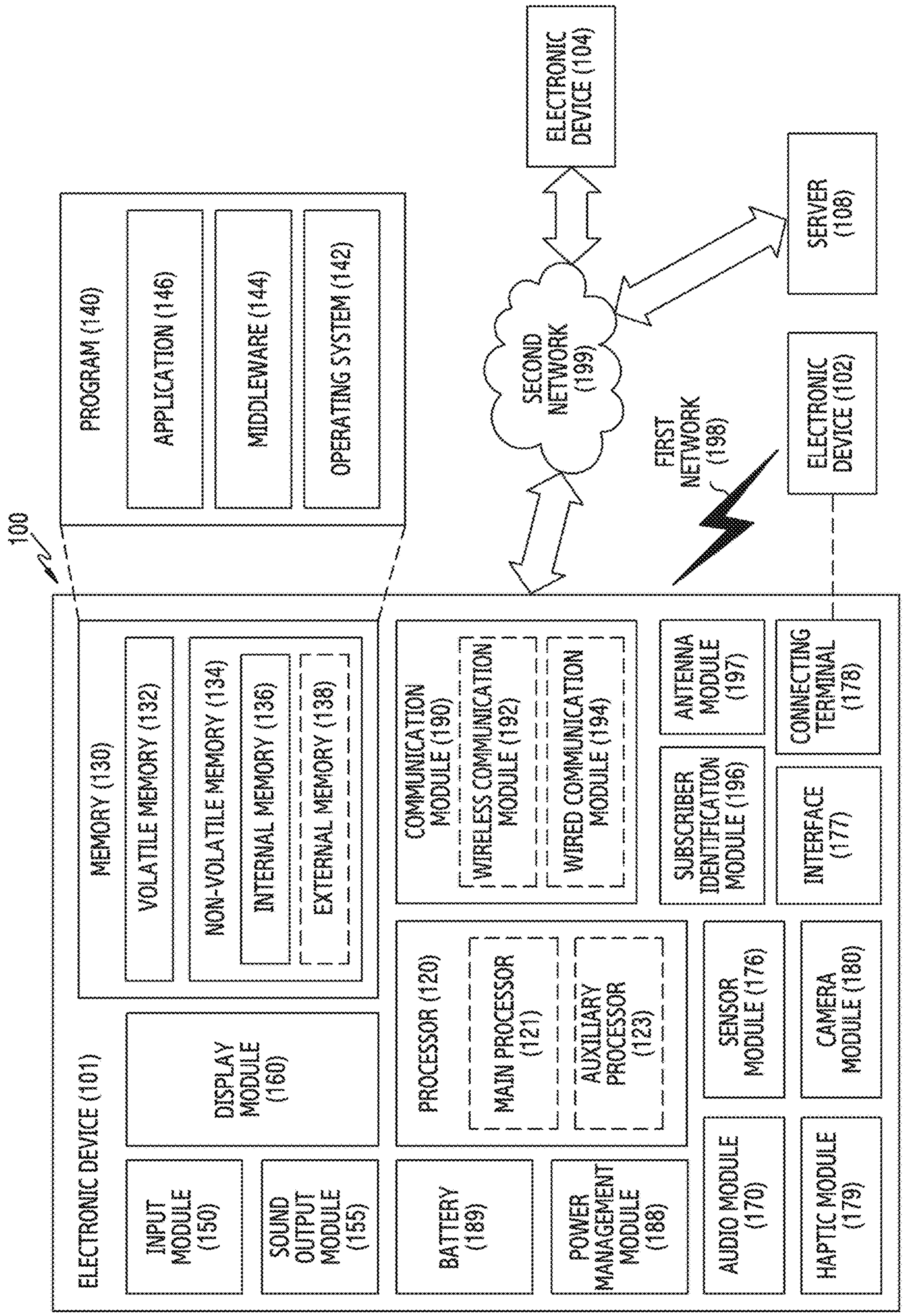
FIG. 1 is a view schematically illustrating an electronic device within a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5th generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4th generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added.

Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
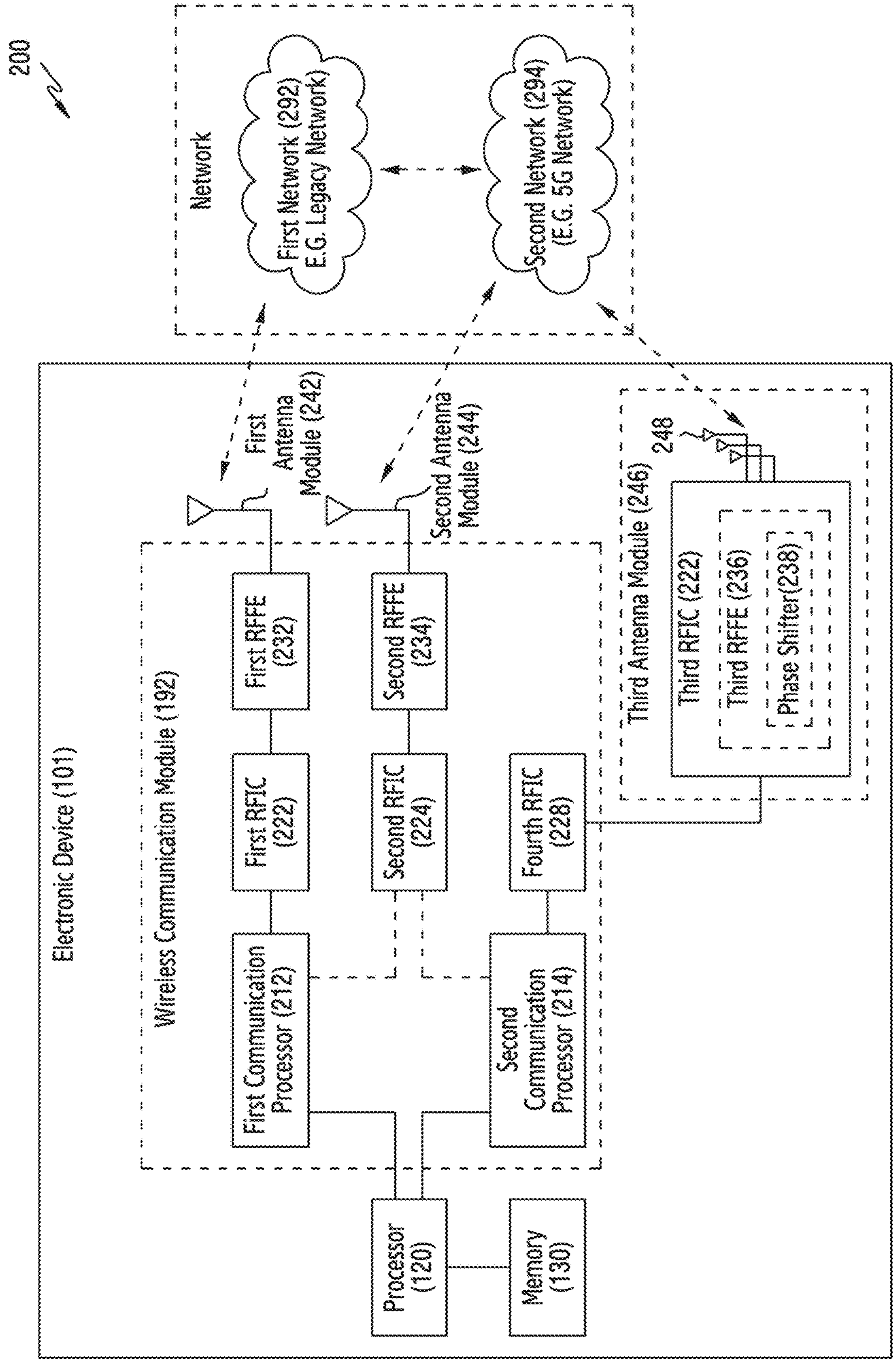
FIG. 2 is a block diagram of an electronic device in a network environment including multiple cellular networks according to an embodiment of the disclosure.

FIG. 2 is a block diagram 200 illustrating an example electronic device 101 in a network environment including a plurality of cellular networks according to an embodiment of the disclosure.

Referring to FIG. 2, an electronic device 101 may include a first communication processor (e.g., including processing circuitry) 212, a second communication processor (e.g., including processing circuitry) 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, and an antenna 248. The electronic device 101 may further include a processor (e.g., including processing circuitry) 120 and a memory 130. The second network 199 may include a first cellular network 292 and a second cellular network 294. According to an embodiment, the electronic device may further include at least one of the parts shown in FIG. 1 and the second network 199 may further include at least one another network. According to another embodiment, the first communication processor 212, the second communication processor 214, the first RFIC 222, the second RFIC 224, the fourth RFIC 228, the first RFFE 232, and the second RFFE 234 may form at least a portion of a wireless communication module 192. According to yet another embodiment, the fourth RFIC 228 may be omitted or may be included as a portion of the third RFIC 226.

The first communication processor 212 may support establishment of a communication channel with a band to be used for wireless communication with the first cellular network 292 and legacy network communication through the established communication channel. According to an embodiment, the first cellular network may be a legacy network including a 2nd generation (2G), 3rd generation (3G), 4G, or Long-Term Evolution (LTE) network. The second communication processor 214 may support establishment of a communication channel corresponding to a designated band (e.g., about 6 GHz to about 60 GHz) of a band to be used for wireless communication with the second cellular network 294 and 5G network communication through the established communication channel. According to another embodiment, the second cellular network 294 may be a 5G network that is defined in 3rd generation partnership project (3GPP). Further, according to yet another embodiment, the first communication processor 212 or the second communication processor 214 may support establishment of a communication channel corresponding to another designated band (e.g., about 6 GHz or less) of a band to be used for wireless communication with the second cellular network 294 and 5G network communication through the established communication channel. According to an embodiment, the first communication processor 212 and the second communication processor 214 may be implemented in a single chip or a single package. According to another embodiment, the first communication processor 212 or the second communication processor 214 may be disposed in a single chip or a single package together with the processor 120, the auxiliary processor 123, or the communication module 190. According to yet another embodiment, the first communication processor 212 and the second communication processor 214 is directly or indirectly connected by an interface (not shown), thereby being able to provide or receive data or control signal in one direction or two directions.

The first RFIC 222, in transmission, may convert a baseband signal generated by the first communication processor 212 into a radio frequency (RF) signal of about 700 MHz to about 3 GHz that is used for the first cellular network 292 (e.g., a legacy network). In reception, an RF signal may be obtained from the first cellular network 292 (e.g., a legacy network) through an antenna (e.g., the first antenna module 242) and may be preprocessed through an RFFE (e.g., the first RFFE 232). The first RFIC 222 may covert the preprocessed RF signal into a baseband signal so that the preprocessed RF signal may be processed by the first communication processor 212.

The second RFIC 224 may convert a baseband signal generated by the first communication processor 212 or the second communication processor 214 into an RF signal in a Sub6 band (e.g., about 6 GHz or less) (hereafter, 5G Sub6 RF signal) that is used for the second cellular network 294 (e.g., a 5G network). In reception, a 5G Sub6 RF signal may be obtained from the second cellular network 294 (e.g., a 5G network) through an antenna (e.g., the second antenna module 244) and may be preprocessed through an RFFE (e.g., the second RFFE 234). The second RFIC 224 may convert the processed 5G Sub6 RF signal into a baseband signal so that the processed 5G Sub6 RF signal may be processed by a corresponding communication processor of the first communication processor 212 or the second communication processor 214.

The third RFIC 226 may convert a baseband signal generated by the second communication processor 214 into an RF signal in a 5G Above6 band (e.g., about 6 GHZ~about 60 GHz) (hereafter, 5G Above6 RF signal) that is used for the second cellular network 294 (e.g., a 5G network). In reception, a 5G Above6 RF signal may be obtained from the second cellular network 294 (e.g., a 5G network) through an antenna (e.g., the antenna 248) and may be preprocessed through the third RFFE 236. The third RFIC 226 may covert the preprocessed 5G Above6 RF signal into a baseband signal so that the preprocessed 5G Above6 RF signal may be processed by the first communication processor 214. According to an embodiment, the third RFFE 236 may be provided as a portion of the third RFIC 226.

The electronic device 101, according to another embodiment, may include a fourth RFIC 228 separately from or as at least a portion of the third RFIC 226. The fourth RFIC 228 may convert a baseband signal generated by the second communication processor 214 into an RF signal in an intermediate frequency band (e.g., about 9 GHz~about 11 GHz) (hereafter, IF signal), and then transmit the IF signal to the third RFIC 226. The third RFIC 226 may convert the IF signal into a 5G Above6 RF signal. In reception, a 5G Above6 RF signal may be received from the second cellular network 294 (e.g., a 5G network) through an antenna (e.g., the antenna 248) and may be converted into an IF signal by the third RFIC 226. The fourth RFIC 228 may covert the IF signal into a baseband signal so that IF signal may be processed by the second communication processor 214.

According to yet another embodiment, the first RFIC 222 and the second RFIC 224 may be implemented as at least a portion of a single chip or a single package. According to an embodiment, the first RFFE 232 and the second RFFE 234 may be implemented as at least a portion of a single chip or a single package. According to another embodiment, at least one of the first antenna module 242 or the second antenna module 244 may be omitted, or may be combined with another antenna module and may process RF signals in a plurality of bands.

According to yet another embodiment, the third RFIC 226 and the antenna 248 may be disposed on a substrate, thereby being able to form a third antenna module 246. For example, the wireless communication module 192 or the processor 120 may be disposed on a first substrate (e.g., a main PCB). The third RFIC 226 may be disposed in a partial area (e.g., the bottom) and the antenna 248 may be disposed in another partial area (e.g., the top) of a second substrate (e.g., a sub PCB) that is different from the first substrate, thereby being able to form the third antenna module 246. By disposing the third RFIC 226 and the antenna 248 on the same substrate, it is possible to reduce the length of the transmission line therebetween. Accordingly, it is possible to reduce a loss (e.g., attenuation) of a signal in a high-frequency band (e.g., about 6 GHz~about 60 GHz), for example, which is used for 5G network communication, due to a transmission line. Accordingly, the electronic device 101 may improve the quality and the speed of communication with the second cellular network 294 (e.g., 5G network).

According to an embodiment, the antenna 248 may be an antenna array including a plurality of antenna elements that may be used for beamforming. The third RFIC 226, for example, as a portion of the third RFFE 236, may include a plurality of phase shifters 238 corresponding to the antenna elements. In transmission, the phase shifters 238 may convert the phase of a 5G Above6 RF signal to be transmitted to the outside of the electronic device 101 (e.g., to a base station of a 5G network) through the respectively corresponding antenna elements. In reception, the phase shifters 238 may convert the phase of a 5G Above6 RF signal received from the outside through the respectively corresponding antenna element into the same or substantially the same phase. This enables transmission or reception through beamforming between the electronic device 101 and the outside.

The second cellular network 294 (e.g., a 5G network) may be operated independently from (e.g., Stand-Along (SA)) or connected and operated with (e.g., Non-Stand Along (NSA)) the first cellular network 292 (e.g., a legacy network). For example, there may be only an access network (e.g., a 5G radio access network (RAN) or a next generation RAN (NG RAN)) and there is no core network (e.g., a next generation core (NGC)) in a 5G network. The electronic device 101 may access the access network of the 5G network and then may access an external network (e.g., the internet) under control by the core network (e.g., an evolved packed core (EPC)) of the legacy network. Protocol information (e.g., LTE protocol information) for communication with a legacy network or protocol information (e.g., New Radio (NR) protocol information) for communication with a 5G network may be stored in the memory 230 and accessed by another part (e.g., the processor 120, the first communication processor 212, or the second communication processor 214).

Figure 3A:
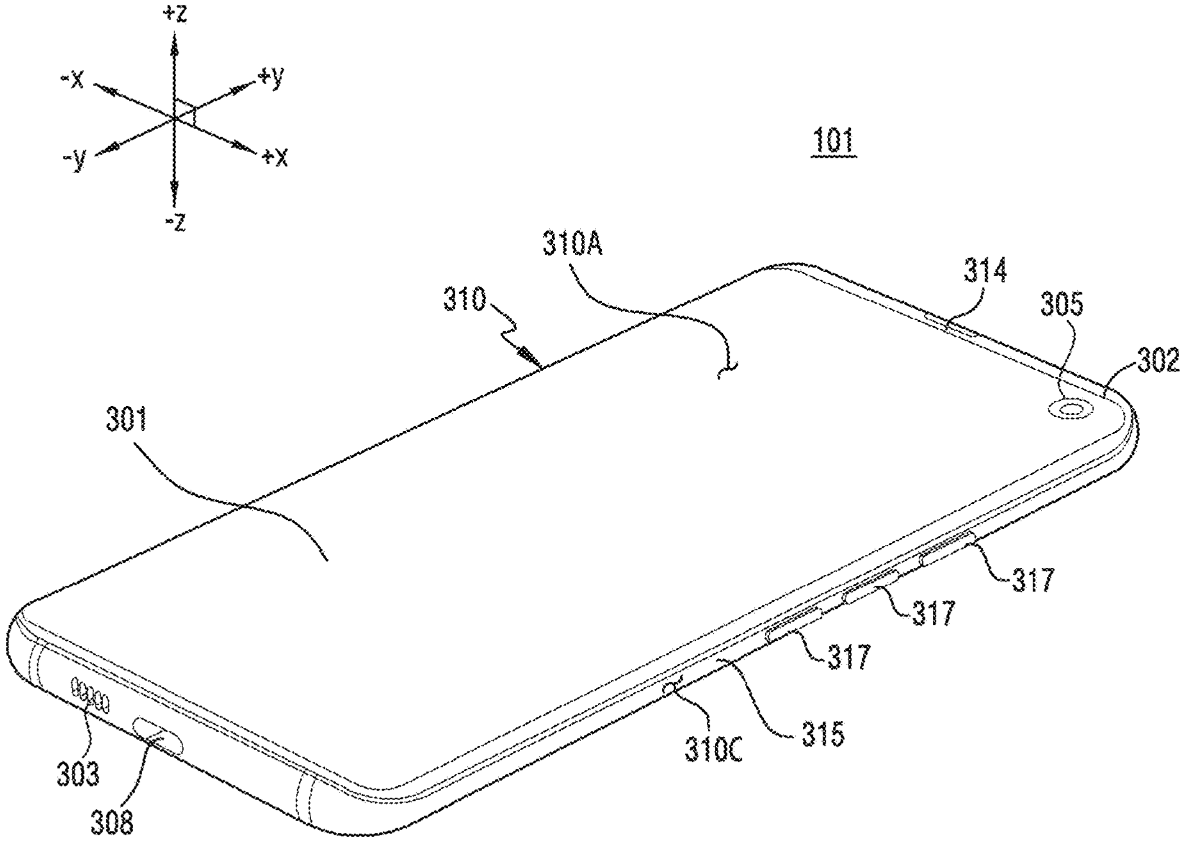
FIG. 3A is a perspective view illustrating an electronic device according to an embodiment of the disclosure.

FIG. 3A is a perspective view illustrating an electronic device according to an embodiment of the disclosure.

Figure 3B:
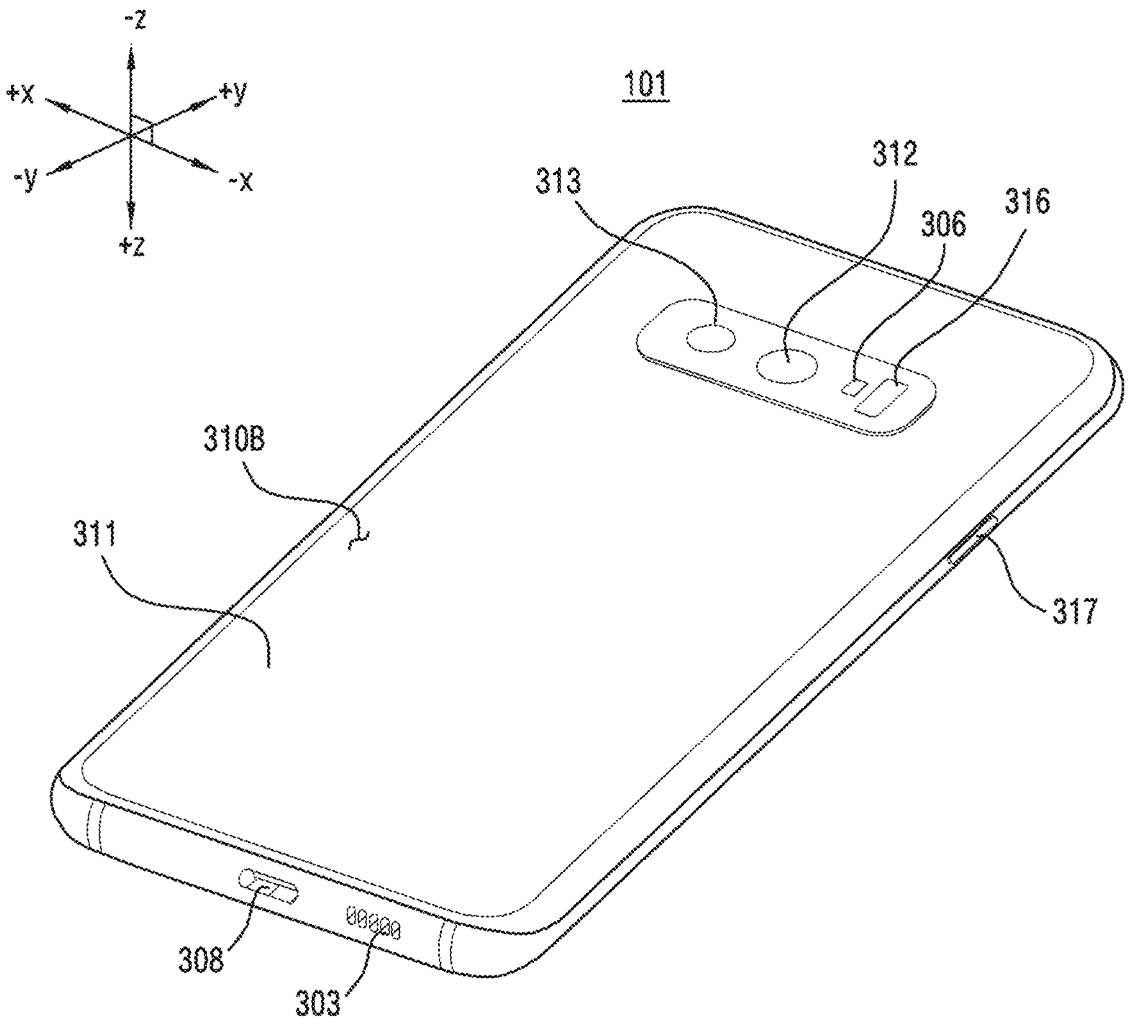
FIG. 3B is a rear perspective view illustrating the electronic device of FIG. 3A according to an embodiment of the disclosure.

FIG. 3B is a rear perspective view illustrating the electronic device of FIG. 3A according to an embodiment of the disclosure.

Referring to FIGS. 3A and 3B, an electronic device 101 according to an embodiment may include a housing 310 including a first surface (or a front surface) 310A, a second surface (or a rear surface) 310B, and a side surface 310C (or a side wall) surrounding the space between the first surface 310A and the second surface 310B. In another embodiment (not illustrated), the "housing" may refer to a structure forming a part of the first surface 310A, the second surface 310B, and the side surface 310C in FIGS. 3A and 3B.

According to yet another embodiment, at least a portion of the first surface 310A of the electronic device 101 may be defined by a substantially transparent front plate 302 (e.g., a glass plate or a polymer plate including various coating layers). According to an embodiment, the front plate 302 may include a curved portion bent and seamlessly extending from the first surface 310A toward the rear plate 311 in at least one side edge portion.

According to another embodiment, the second surface 310B may be defined by a substantially opaque rear plate 311. The rear plate 311 may be made of, for example, coated or colored glass, ceramic, polymer, metal (e.g., aluminum, stainless steel (STS), or magnesium), or a combination of two or more of these materials. According to yet another embodiment, the rear plate 311 may include a curved portion bent and extending seamlessly from the second surface 310B toward the front plate 302 in at least one side edge portion.

According to an embodiment, the side surface 310C of the electronic device 101 may be coupled to the front plate 302 and the rear plate 311, and may be configured with a frame structure 315 including metal and/or polymer. In another embodiment, the rear plate 311 and the frame structure 315 may be configured integrally and may include substantially the same material (e.g., a metal material such as aluminum).

According to yet another embodiment, the electronic device 101 may include at least one of a display 301, an audio module (e.g., the audio module 170 in FIG. 1), a sensor module, a first camera module 305, a key input device 317, and a connector hole 308. In an embodiment, in the electronic device 101, at least one of the components (e.g., the key input device 317) may be omitted, or other components may be additionally included. For example, the electronic device 101 may include a sensor module (not illustrated). For example, in an area provided by the front plate 302, a sensor, such as a proximity sensor or an illuminance sensor, may be integrated into the display 301 or disposed at a position adjacent to the display 301. In another embodiment, the electronic device 101 may further include a light-emitting element, and the light-emitting element may be disposed at a position adjacent to the display 301 in the area provided by the front plate 302. The light-emitting element may provide, for example, the state information of the electronic device 101 in an optical form. In yet another embodiment, the light-emitting element may provide, for example, a light source that is interlocked with the operation of the first camera module 305. The light-emitting element may include, for example, a light emitting diode (LED), an IR LED, and/or a xenon lamp.

The display 301 may be visible to the exterior through, for example, a considerable portion of the front plate 302. In an embodiment, the edges of the display 301 may be provided to be substantially the same as the outer peripheral shape (e.g., a curved surface) of the front plate 302 adjacent thereto. In another embodiment, the distance between the outer periphery of the display 301 and the outer periphery of the front plate 302 may be substantially constant in order to enlarge the exposed area of the display 301. In yet another embodiment, a recess or an opening may be provided in a portion of a screen display area of the display 301, and other electronic components aligned with the recess or the opening, such as the first camera module 305, a proximity sensor (not illustrated), or an illuminance sensor (not illustrated), may be included.

In an embodiment, the rear surface of the screen display area of the display 301 may include at least one of a second camera module 312, a third camera module 313, a fingerprint sensor 316, and a flash 306. In another embodiment, the display 301 may be coupled to or disposed adjacent to a touch-sensitive circuit, a pressure sensor capable of measuring a touch intensity (pressure), and/or a digitizer configured to detect a magnetic field-type stylus pen. In yet another embodiment, the display 301 may include a fingerprint sensor 316, a touch-sensitive circuit, a pressure sensor, and/or a digitizer.

According to an embodiment, the audio module 170 may include a microphone hole and/or a speaker hole. The microphone hole may include a microphone disposed therein so as to acquire external sound. In another embodiment, multiple microphones may be disposed in the microphone hole so as to detect the direction of sound. In yet another embodiment, the speaker hole and the microphone hole may be implemented as a single hole 303, or a speaker (e.g., a piezo speaker) may be included without a speaker hole. The speaker hole may include an external speaker hole and a call receiver hole 314.

According to an embodiment, by including a sensor module (not illustrated), the electronic device 101 may generate an electrical signal or a data value corresponding to an internal operating state of the electronic device 101 or an external environmental condition. The sensor module may further include, for example, a proximity sensor disposed on the first surface 310A of the housing 310, a fingerprint sensor included in or disposed adjacent to the display 301, and/or a biometric sensor (e.g., an HRM sensor) disposed on the second surface 310B of the housing 310. The electronic device 101 may further include at least one of sensor modules (not illustrated), such as a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or an illuminance sensor.

In another embodiment, the electronic device 101 may include a second camera module 312, a third camera module 313, and/or a flash 306 disposed on the second surface 310B. The first camera module 305, the second camera module 312, and/or the third camera module 313 may include one or more lenses, an image sensor, and/or an image signal processor. In yet another embodiment, the electronic device 101 may include a flash 306. The flash 306 may include, for example, a light-emitting diode or a xenon lamp. In an embodiment, two or more lenses (e.g., an infrared camera lens, a wide-angle lens, and/or a telephoto lens) and image sensors may be disposed on one surface of the electronic device 101.

In another embodiment, the key input devices 317 may be arranged on the side surface 310C of the housing 310. In yet another embodiment, the electronic device 101 may not include some or all of the above-mentioned key input devices 317, and a key input device 317, which is not included in the electronic device 101, may be implemented in another form, such as a soft key, on the display 301. In an embodiment, the key input devices may include at least a portion of a fingerprint sensor 316 disposed on the second surface 310B of the housing 310.

According to another embodiment, the connector hole 308 may accommodate a connector configured to transmit and receive power and/or data to and from an external electronic device, and/or a connector configured to transmit and receive an audio signal to and from an external electronic device. For example, the connector hole 308 may include a USB connector or an earphone jack.

Figure 4A:
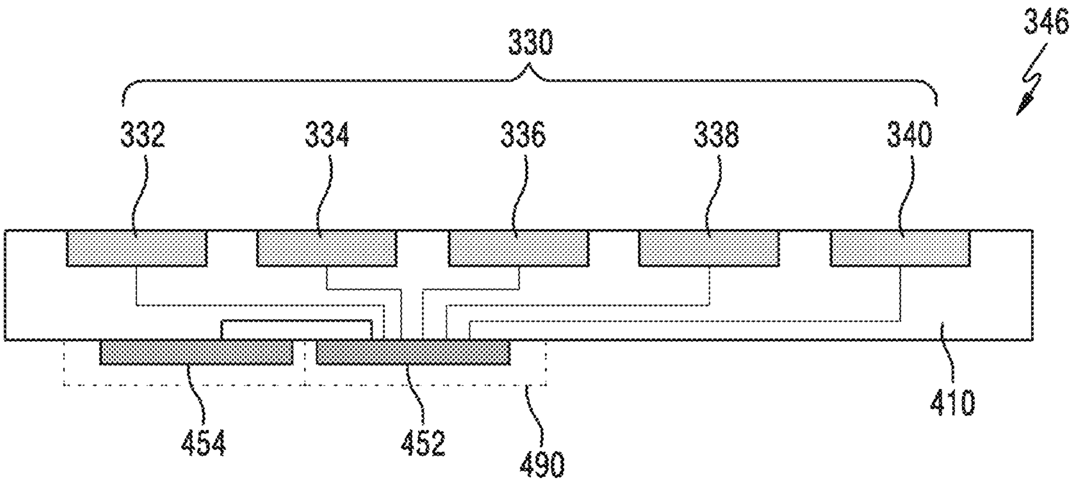
FIG. 4A is a cross-sectional view illustrating a first antenna module according to an embodiment of the disclosure.

FIG. 4A is a cross-sectional view illustrating a first antenna module according to an embodiment of the disclosure.

Referring to FIG. 4A, the first antenna module 346 according to an embodiment may include a first printed circuit board 410, first conductive patches 330, a first wireless communication circuit 452, and/or a power manage integrate circuit (PMIC) 454. In another embodiment, the first antenna module 346 may further include a shielding member 490 (e.g., a shield can).

In yet another embodiment, the printed circuit board 410 may include multiple conductive layers and multiple non-conductive layers stacked alternately with the conductive layers. The first printed circuit board 410 may provide electrical connection between various electronic components disposed on the first printed circuit board 410 by using wires and conductive vias provided in the conductive layers.

In an embodiment, the first antenna module 346 may include first conductive patches 330. For example, the first antenna module 346 may include a first conductive patch 332, a second conductive patch 334, a third conductive patch 336, a fourth conductive patch 338, and/or a fifth conductive patch 340. In another embodiment, the first conductive patches 330 may operate as antenna elements for forming a directional beam. In yet another embodiment, as illustrated in FIG. 4A, the first conductive patches 330 may be provided on a first surface of the first printed circuit board 410 or at a position adjacent to the first surface. In an embodiment, the first conductive patches 330 may be provided in the first printed circuit board 410. According to another embodiment, the first antenna module 346 may further include a plurality of antenna arrays which are the same as or different from each other in shape or type (e.g., dipole antenna arrays, and/or additional patch antenna arrays) in addition to the first conductive patches 330.

In yet another embodiment, the first wireless communication circuit 452 may be disposed on a second surface opposite to the first surface of the first printed circuit board 410. In an embodiment, the first wireless communication circuit 452 may be configured to process an RF signal of a predetermined frequency band (e.g., a frequency band of 10 GHz or higher) transmitted and/or received via the first conductive patches 330. According to another embodiment, the first wireless communication circuit 452 may convert a baseband signal obtained from the processor 120 to an RF signal of a predetermined frequency band in order to transmit the RF signal of the predetermined frequency band. The first wireless communication circuit 452 may convert an RF signal of the predetermined frequency band received via the first conductive patches 330 into a baseband signal and provide the baseband signal to the processor 120.

According to yet another embodiment, an RF signal transmitted and/or received in a frequency band of 10 GHz or higher may have a polarization characteristic. For example, a first RF signal in the frequency band of 10 GHz or more may have a horizontal polarization characteristic, and a second RF signal in the frequency band of about 10 GHz or more may have a vertical polarization characteristic. Accordingly, the electronic device 101 may transmit various types of information to an external device by using the first RF signal and/or the second RF signal having different polarization characteristics.

According to an embodiment, the first wireless communication circuit 452 (e.g., the third RFIC 226 in FIG. 2) may up-convert an IF signal (e.g., about 9 GHz to about 11 GHZ) obtained from an intermediate frequency integrate circuit (IFIC) (e.g., the fourth RFIC 228 in FIG. 2) into an RF signal of a selected band in order to transmit the RF signal. In addition, the first wireless communication circuit 452 may down-convert an RF signal obtained via the first conductive patches 330 into an IF signal to transmit the IF signal to the IFIC.

The PMIC 454 according to another embodiment may be disposed on the second surface of the first printed circuit board 410. The PMIC 454 may provide power required for various electronic components (e.g., the first wireless communication circuit 452) of the first antenna module 346.

In yet another embodiment, the shielding member 490 may be disposed on the second surface of the first printed circuit board 410 to electromagnetically shield at least one of the first wireless communication circuit 452 and the PMIC 454. For example, the shielding member 490 may be disposed on the second surface of the first printed circuit board 410 to cover the first wireless communication circuit 452 and/or the PMIC 454. In an embodiment, the shielding member 490 may include an encapsulant such as an epoxy molding compound (EMC) or a shield can, but is not limited thereto. Although not illustrated in the embodiment, according to various embodiments, the first antenna module 346 may be electrically connected to another printed circuit board (e.g., the main printed circuit board 501 in FIG. 5A) via an interface. For example, the interface may include various connection members (e.g., a coaxial cable connector, a board-to-board connector, an interposer, or a flexible printed circuit board (FPCB)). In various embodiments, the first wireless communication circuit 452 and/or the PMIC 454 of the first antenna module 346 may be electrically connected to another printed circuit board via the connection member.

Although the first antenna module 346 illustrated in FIG. 4A is illustrated as including first conductive patches 330 configuring a 1×5 antenna array, the disclosure is not limited thereto, and the first antenna module 346 may include various numbers and arrangements of conductive patches. For example, the first antenna module 346 may include a first conductive patch 332 and a second conductive patch 334, wherein the first conductive patch 332 and the second conductive patch 334 may configure a 1×2 antenna array. As another example, the first antenna module 346 may include a first conductive patch 332, a second conductive patch 334, a third conductive patch 336, and a fourth conductive patch 338, wherein the first conductive patch 332, the second conductive patch 334, the third conductive patch 336, and the fourth conductive patch 338 may configure a 1×4 antenna array. Hereinafter, FIG. 4B illustrates an antenna module according to another embodiment including conductive patches forming a 1×4 antenna array.

Figure 4B:
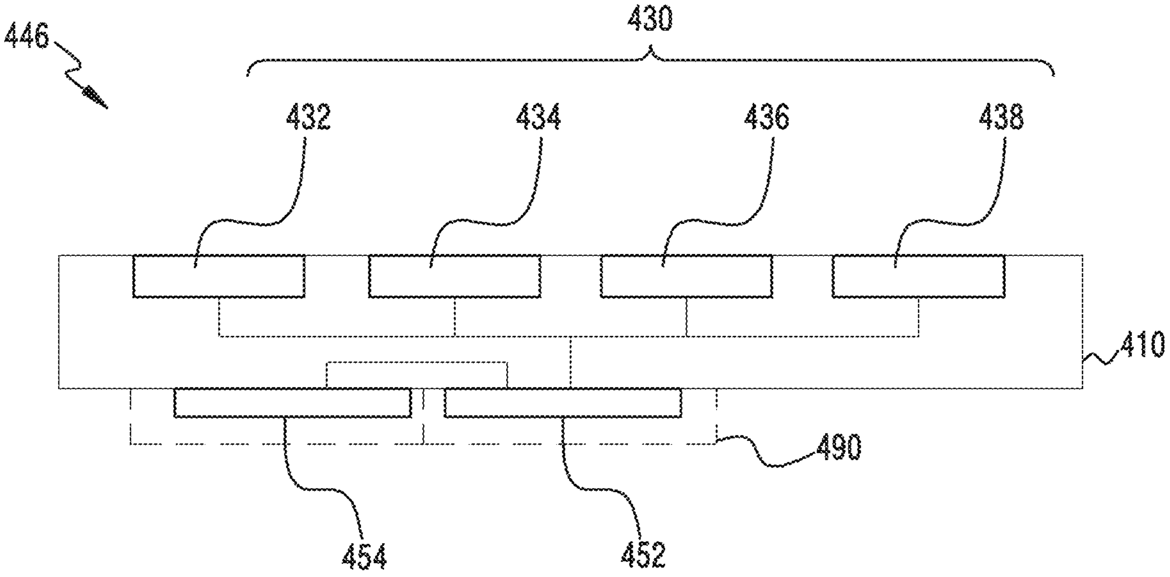
FIG. 4B is a view illustrating a first antenna module according to an embodiment of the disclosure.

FIG. 4B is a view illustrating a first antenna module according to an embodiment of the disclosure.

Referring to FIG. 4B, the first antenna module 446 according to an embodiment may include a plurality of conductive patches 430. For example, the first antenna module 446 may include a first conductive patch 432, a second conductive patch 434, a third conductive patch 336, and/or a fourth conductive patch 438. In another embodiment, the first conductive patch 432, the second conductive patch 434, the third conductive patch 436, and the fourth conductive patch 438 may configure a 1×4 antenna array.

Figure 5A:
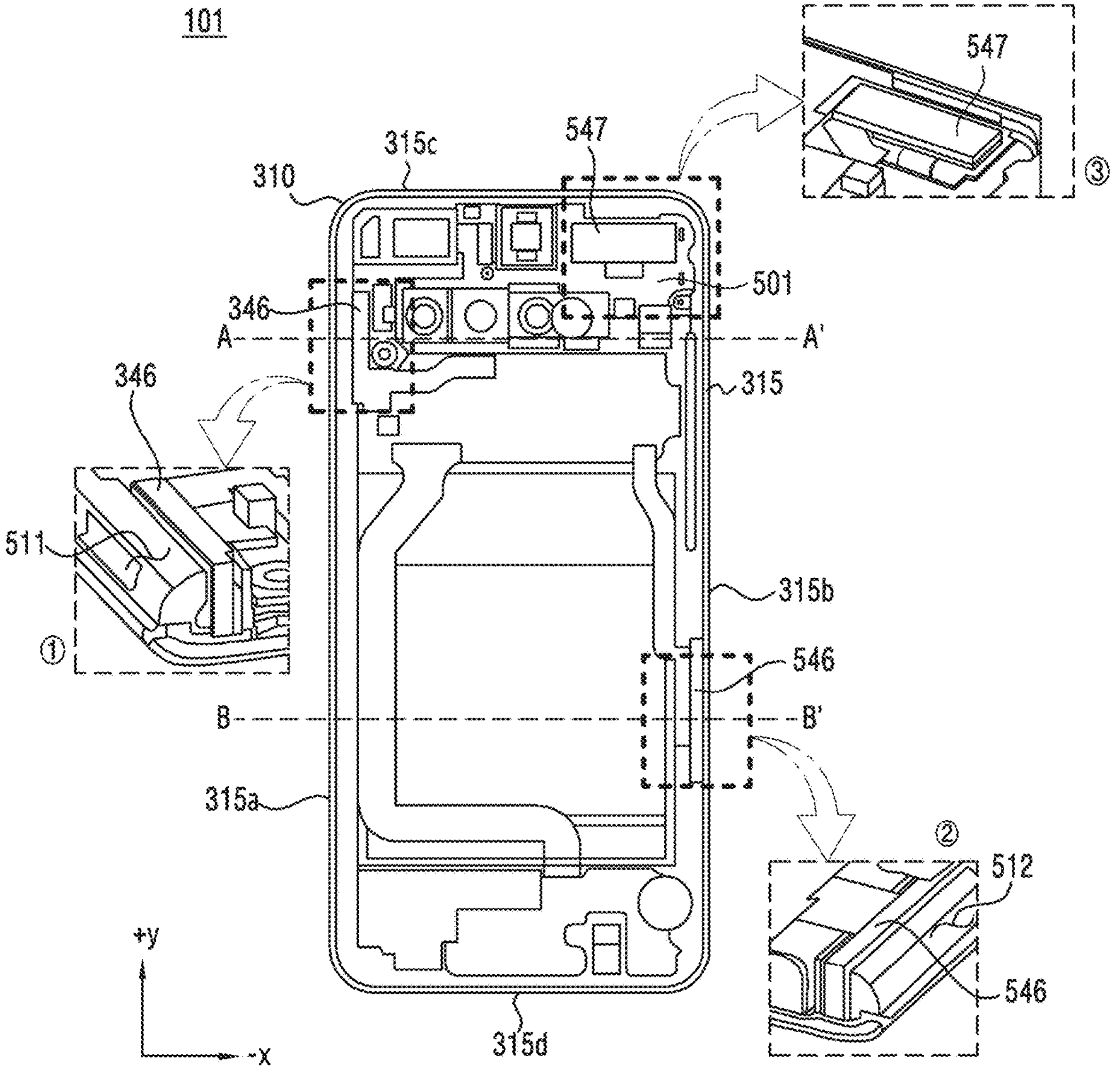
FIG. 5A is a view provided for describing positions of antenna modules disposed in an electronic device according to an embodiment of the disclosure.

FIG. 5A is a view provided for describing positions of antenna modules disposed in an electronic device according to an embodiment of the disclosure.

Referring to FIG. 5A, the electronic device 101 according to an embodiment may include a first antenna module 346, a second antenna module 546, and/or a third antenna module 547. In another embodiment, the second antenna module 546 and the third antenna module 547 may include substantially the same components as the first antenna module 346 illustrated in FIG. 4A (e.g., a printed circuit board, conductive patches, or a radio communication circuit). A detailed description of the second antenna module 546 will be described later with reference to FIG. 6.

According to yet another embodiment, the first antenna module 346 and/or the second antenna module 546 may be disposed adjacent to the frame structure 315. For example, the frame structure 315 may include a first frame 315*a*, a second frame 315*b*, a third frame 315*c*, and a fourth frame 315*d*. The first frame 315*a*, the second frame 315*b*, the third frame 315*c*, and the fourth frame 315*d* may be, for example, coupled to each other or integrally configured. In an example, the first antenna module 346 may be disposed adjacent to the first frame 315*a* that configures the first side surface 511 of the electronic device 101. As another example, the second antenna module 546 may be disposed adjacent to the second frame 315*b* that configures the second side surface 512 of the electronic device 101.

According to an embodiment, the first antenna module 346 may be disposed to face the first side surface 511 to form a main beam pattern in the +x-axis (i.e., A to A') direction of an electronic component (e.g., a battery) of the electronic device 101. As another embodiment, the second antenna module 546 may be disposed to face the second side surface 512 to form a main beam pattern in the −x-axis (i.e., B to B') direction of an electronic component (e.g., a battery) of the electronic device 101. However, the position and structure in which the first antenna module 346 and/or the second antenna module 546 are arranged are not limited to the position and structure illustrated in FIG. 5A, and the first antenna module 346 and/the second antenna module 546 may be disposed in various positions in the electronic device 101 with various arrangement structures.

The third antenna module 547 according to yet another embodiment may be disposed to form a main beam pattern in a direction in which the second surface 310B of the electronic device 101 is oriented. For example, the third antenna module 547 may be disposed to face the rear surface 310B of the electronic device 101. The location and structure of the electronic device 101 in which the third antenna module 547 illustrated in FIG. 5A is disposed are only an example, and the disclosure is not limited thereto.

Figure 5B:
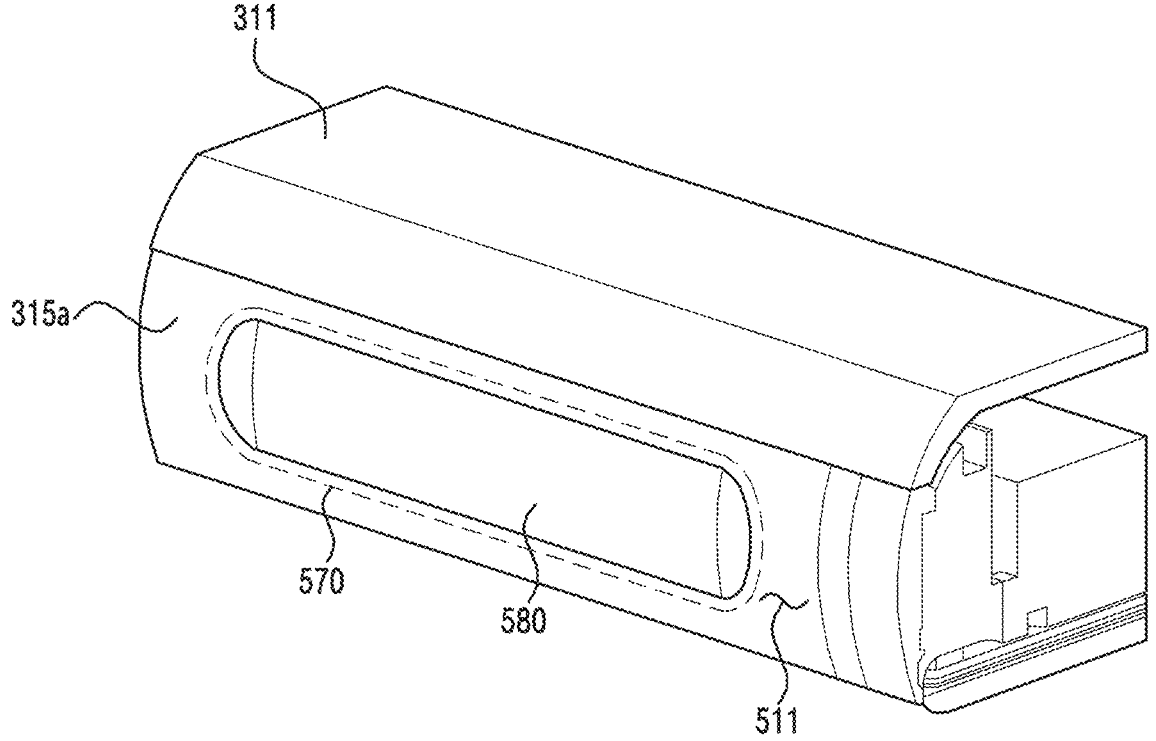
FIG. 5B is a view illustrating a first frame to which the first antenna module is disposed adjacent and an opening area provided in the first frame according to an embodiment of the disclosure.

FIG. 5B is a view illustrating a first frame to which the first antenna module is disposed adjacent and an opening area provided in the first frame according to an embodiment of the disclosure.

Referring to FIG. 5B, the first frame 315*a* according to an embodiment may include a first opening area 570 in one area. In another embodiment, a dielectric material 580 may be disposed in the first opening area 570. In yet another embodiment, the dielectric material 580 may be disposed in the first opening area 570 to configure the first side surface 511 of the electronic device 101 together with the first frame 315*a*. In an embodiment, the first opening area 570 may have a quadrilateral shape, but is not limited thereto. The first opening area 570 may have various shapes. In another embodiment, the first opening area 570 may be formed to have a size and shape that is capable of overlapping the first conductive patches 330 included in the first antenna module 346 when viewed in the +x-axis direction.

In yet another embodiment, an RF signal transmitted and/or received as the first wireless communication circuit 452 feeds power to the first conductive patches 330 may pass through the first opening area 570 and the cover the dielectric material 580 disposed in the first opening area 570.

Figure 5C:
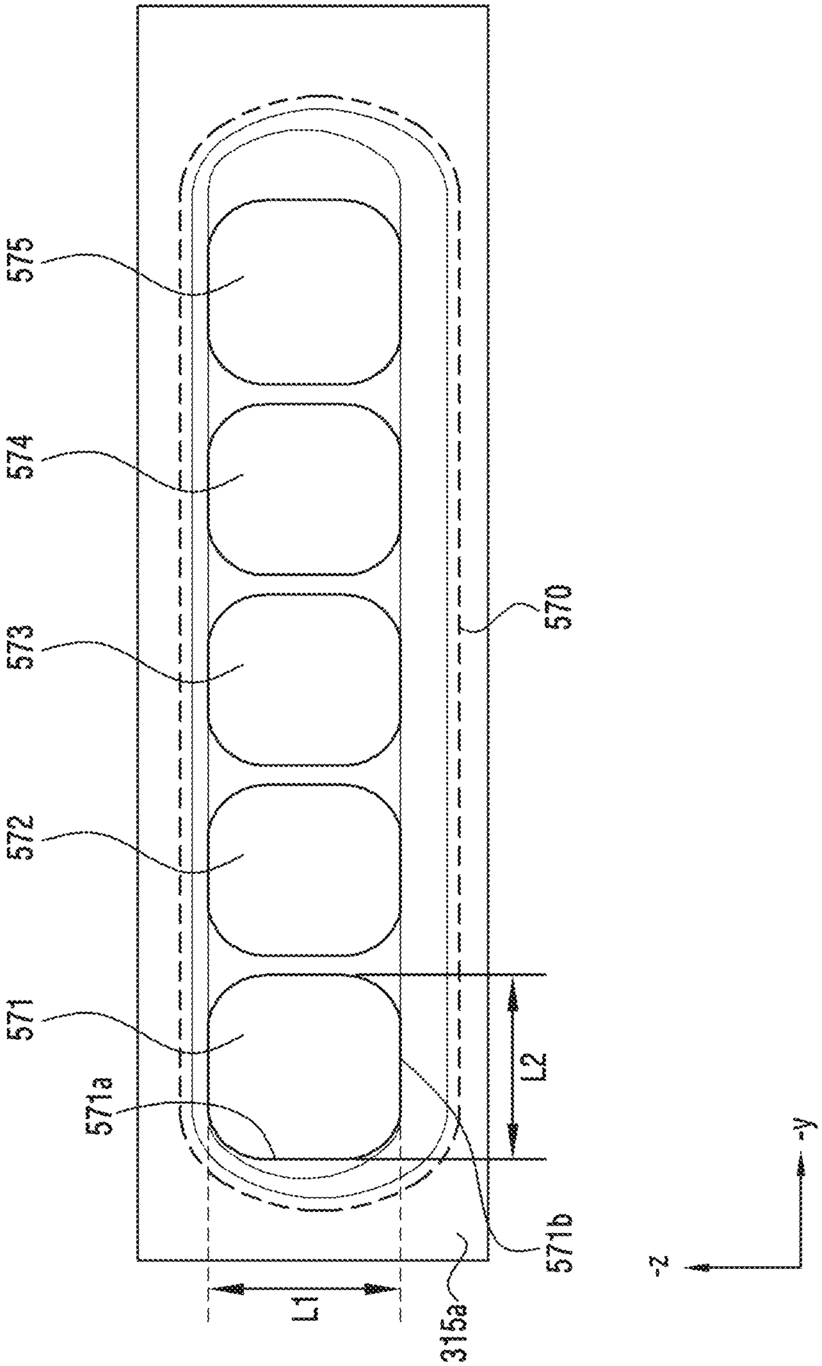
FIG. 5C is a view illustrating an opening area provided in a first frame from which a dielectric material is removed according to an embodiment of the disclosure.

FIG. 5C is a view illustrating an opening area provided in a first frame from which a dielectric material is removed according to an embodiment of the disclosure.

Referring to FIG. 5C, the first opening area 570 provided in the first frame 315*a* according to an embodiment may include a first opening 571, a second opening 572, a third opening 573, a fourth opening area 574 and/or a fifth opening 575. In another embodiment, the plurality of openings 571, 572, 573, 574, and 575 may correspond respectively to the first conductive patches 330 of the first antenna module 346. In yet another embodiment, the plurality of openings 571, 572, 573, 574, and 575 may have a predetermined height and a predetermined width. For example, the first opening 571 may include a first edge 571*a*, and the first edge 571*a* may have a first length L1 to correspond to the height of the first opening 571. In an example, the first opening 571 may include a second edge 571*b* substantially perpendicular to the first edge 571*a*, and the second edge 571*b* corresponding to the width of the first opening 571 may have a second length L2.

In an embodiment, the first opening area 570 is illustrated as including the first opening 571, the second opening 572, the third opening 573, the fourth opening 574, and/or the fifth opening 575. However, this is merely an example, and the number and sizes of openings are not limited thereto.

Figure 5D:
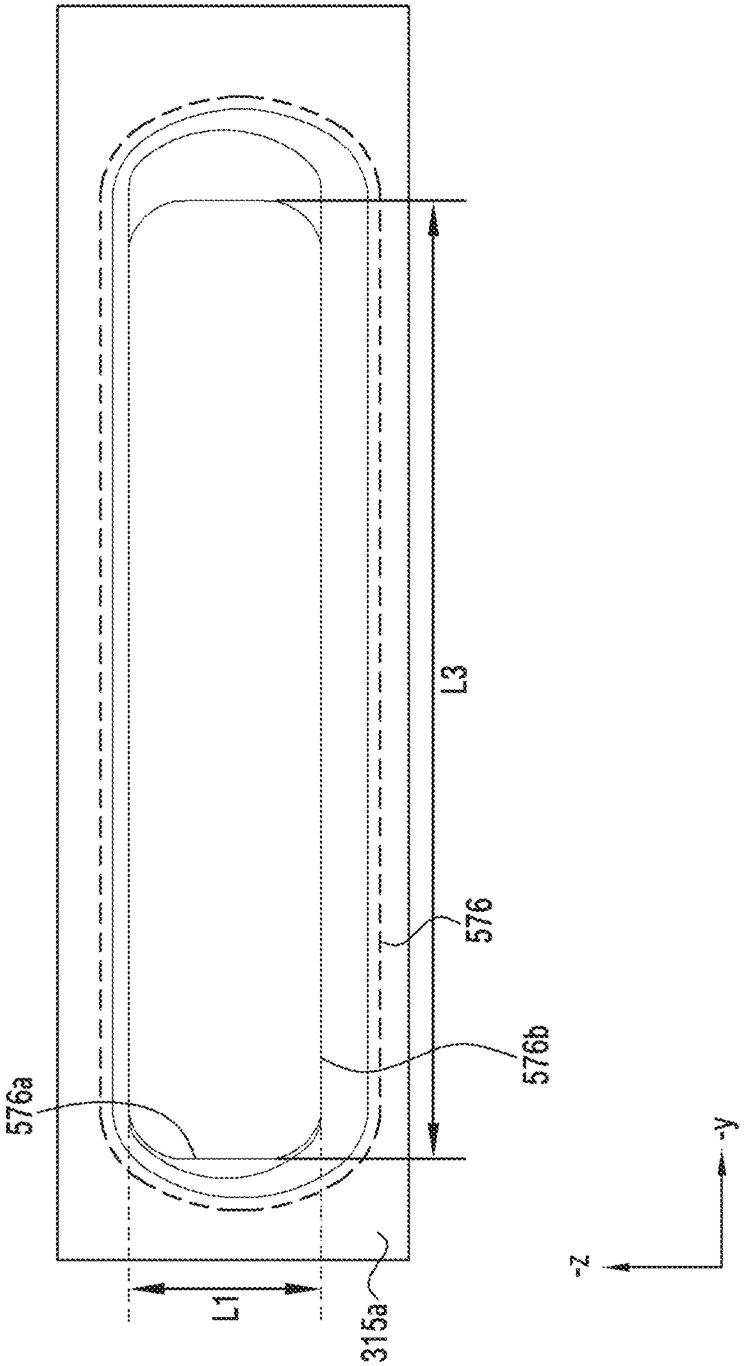
FIG. 5D is a view illustrating an opening area provided in a first frame from which a dielectric material is removed according to an embodiment of the disclosure.

FIG. 5D is a view illustrating an opening area provided in a first frame from which a dielectric material is removed according to an embodiment of the disclosure.

Referring to FIG. 5D, a first opening area 576 may be provided in an area of the first frame 315*a* according to an embodiment. In another embodiment, the first opening area 576 may be provided with a single opening differently from the first opening area 570 that includes a plurality of openings 571, 572, 573, 574, and 575 in FIG. 5C. In yet another embodiment, the first opening area 570 may have a quadrilateral shape, but is not limited thereto. The first opening area 570 may have various shapes.

In an embodiment, the first opening area 576 may have a predetermined height and a predetermined width. For example, the first opening 576 may include a first edge 576*a*, wherein the first edge 576*a* may have a first length L1 to correspond to the height of the first opening 576. In an example, the first opening 576 may include a second edge 576*b* substantially perpendicular to the first edge 576*a*, wherein the second edge 576*b*, which corresponds to the width of the first opening 576, may have a third length L3. The third length L3 may be longer than the first length L1.

Figure 6:
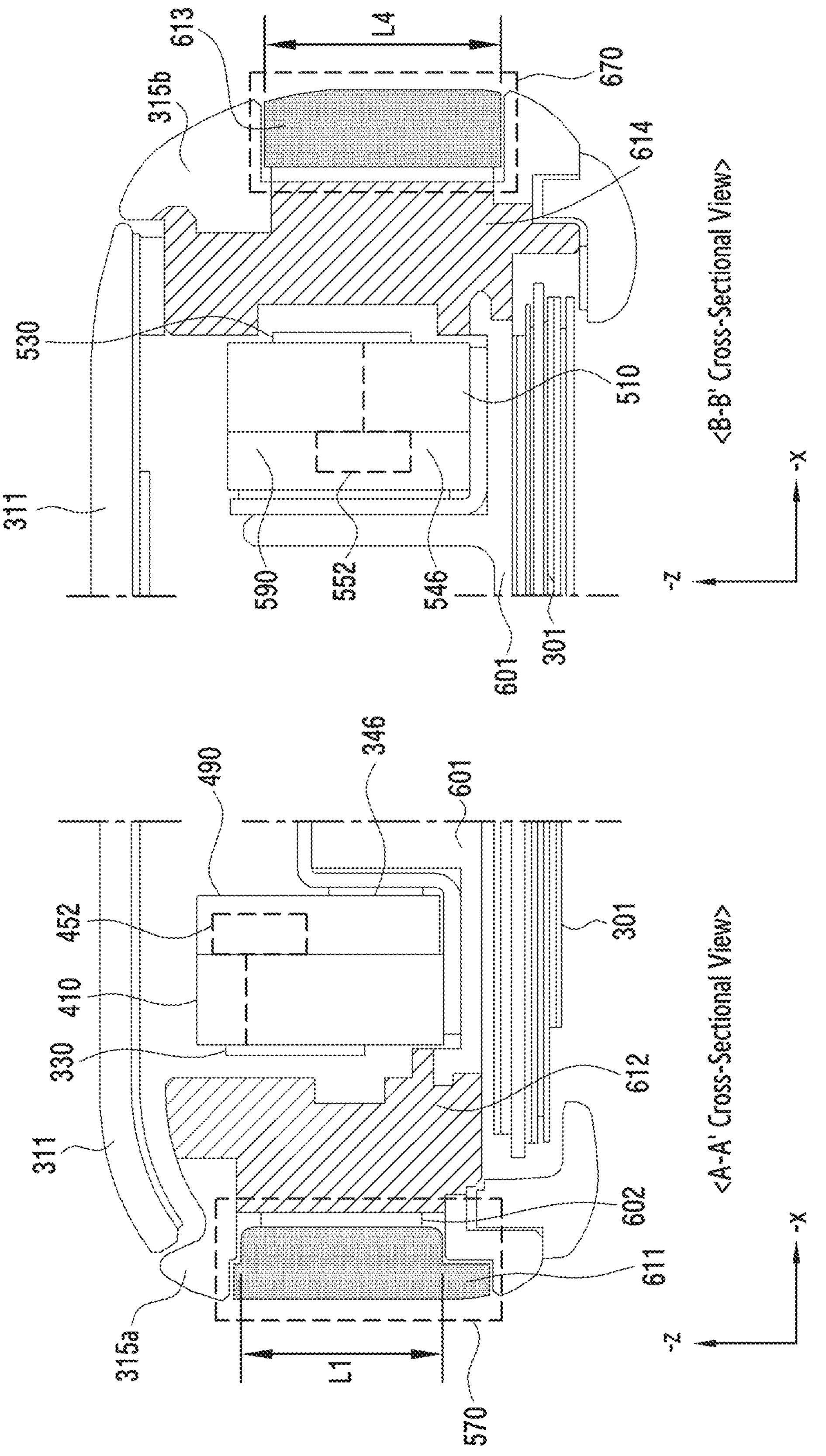
FIG. 6 is a view illustrating a first opening area and dielectric materials disposed between the first opening area and the first antenna module according to an embodiment of the disclosure.

FIG. 6 is a view illustrating a first opening area and dielectric materials disposed between the first opening area and the first antenna module according to an embodiment of the disclosure.

Referring to FIG. 6, A-A cross-sectional view and B-B cross-sectional view of the electronic device 101 of FIG. 5A are illustrated.

According to an embodiment, the electronic device 101 may include a support member 601. The support member 601 may support the first antenna module 346 such that the first antenna module 346 may be located to form a directional beam toward the first frame 315*a*.

According to another embodiment, the electronic device 101 may include a first dielectric material 611 and a second dielectric material 612. In yet another embodiment, the first dielectric material 611 may be disposed in the first opening area 570 and configure the first side surface 511 of the electronic device 101 together with the first frame 315*a*. In an embodiment, at least a portion of the first dielectric material 611 may be located in a portion of the first opening area 570 that has the smallest length in the z-axis direction.

According to another embodiment, the second dielectric material 612 may be disposed between the first dielectric material 611 and the first antenna module 346. The second dielectric material 612 may be coupled to the first dielectric material 611 via the first fixing member 602, and the first dielectric material 611 may be fixed to the first opening area 570. In yet another embodiment, the first dielectric material 611 may have various thicknesses. For example, the first dielectric material 611 may have a thickness of about 1 mm. The second dielectric material 612 may have various thicknesses. For example, the second dielectric material 612 may have a thickness of about 0.7 mm. In an embodiment, the first fixing member 602 may be omitted.

According to another embodiment, the first dielectric material 611 (e.g., glass) may have a higher dielectric constant than the second dielectric material 612. For example, the first dielectric constant of the first dielectric material 611 may have an appropriate value between about 5.5 and 10, and the second dielectric constant of the second dielectric material 612 (e.g., polycarbonate resin (PC)) may have an appropriate value between about 2 and 4.

According to yet another embodiment, an RF signal transmitted and/or received as the first wireless communication circuit 452 feeds power to the first conductive patches 330 may pass through the first dielectric material 611 and the second dielectric material 612. As the transmitted and/or received RF signal passes through the first dielectric material 611 and the second dielectric material 612, the electronic device 101 may secure a higher antenna gain and wider antenna coverage compared to the case in which the RF signal passes through a single dielectric material having a dielectric constant lower than the first dielectric constant of the first dielectric material 611.

For example, the RF signal transmitted and/or received by the electronic device 101 may have a first polarization characteristic in a first direction and a second polarization characteristic in a second direction substantially orthogonal to the first direction. The first direction may mean, for example, a direction parallel to the first edge 571*a* of the first opening 571 of FIG. 5C, and the second direction may mean a direction parallel to the second edge 571*b* of the first opening 571. Hereinafter, it is assumed that the first polarization characteristic in the first direction is a horizontal polarization characteristic and the second polarization characteristic in the second direction is a vertical polarization characteristic.

In order for an RF signal to be transmitted from and/or received to the first antenna module 346 with respect to the exterior of the electronic device 101 when the first dielectric material 611 and/or the second dielectric material 612 are not disposed, it may be necessary for the ½ wavelength (λ/2) of the first signal that has the horizontal polarization characteristic to be smaller than the first length L1 that is the height of the plurality of openings 571, 572, 573, 574, and 575 provided in the first frame 315*a*. In an embodiment, the first length L1 may be various. For example, the first length L1 may correspond to about 3 mm.

In addition, when the first dielectric material 611 and/or the second dielectric material 612 are not disposed, in order for a second signal of the RF signal that has a vertical polarization characteristic to be transmitted to and/or received from the exterior, it may be necessary for the ½ wavelength (λ/2) of the second signal to be smaller than the second length L2 that is the width of the plurality of openings 571, 572, 573, 574, and 575 provided in the first frame 315*a*. However, when the first dielectric material 611 is disposed in the first opening area 570 and the second dielectric material 612 is disposed between the first opening area 570 and the first antenna module 346, the RF signal may pass through the plurality of openings 571, 572, 573, 574, and 575 even when the length of the ½ wavelength of the RF signal (λ/2) is greater than the first length L1, which is the height of the plurality of openings 571, 572, 573, 574, and 575, or greater than the second length L2, which is the width of the plurality of openings 571, 572, 573, 574, and 575.

Accordingly, by disposing the first dielectric material 611 and the second dielectric material 612 in the first opening area 570 and between the first opening area 570 and the first antenna module 346 in the electronic device 101, it may be possible to obtain a wider antenna coverage and a higher antenna gain compared to the case in which a single dielectric material having a lower dielectric constant than the first dielectric material 611 is disposed. Accordingly, by disposing the first dielectric material 611 and the second dielectric material 612 in the first opening area 570 and between the first opening area 570 and the first antenna module 346 in the electronic device 101, it may be possible to shorten the first length L1 or the second length L2 compared to the case in which a single dielectric material having a lower dielectric constant than the first dielectric material 611 is disposed. In consideration of the wavelength of the RF signal passing through the opening, it may be necessary to design the length (e.g., the first length L1 and/or the second length L2) of the opening (e.g., the first opening 571) to be greater than the ½ wavelength of the RF signal passing through the opening. However, when the dielectric material is disposed in the opening, the RF signal is capable of passing through the opening even if the length of the opening may be designed to be shorter than the ½ wavelength of the RF signal (λ/2). Similarly, when the first dielectric material 611 and the second dielectric material 612 are disposed in the opening, the length of the opening (e.g., the first length L1 and/or the second length L2), the length of the opening (e.g., the first length L1 and/or the second length L2) may be relatively reduced compared to the case in which a single dielectric material is disposed in the opening.

According to another embodiment, the second antenna module 546 may include a second printed circuit board 510, second conductive patches 530 disposed on a first surface of the second printed circuit board 510, a second wireless communication circuit 552 disposed on a second surface of the second printed circuit board 510, and/or a second shielding member 590. In yet another embodiment, the second wireless communication circuit 552 may transmit and/or receive an RF signal of a predetermined frequency band (e.g., the band of 10 GHz or higher) by feeding power to the second conductive patches 530.

According to an embodiment, the electronic device 101 may include a support member 601. The support member 601 may support the second antenna module 546 such that the second antenna module 546 is able to form a directional beam toward the second frame 315*b*.

According to another embodiment, the second frame 315*b* may include a second opening area 670 in one area thereof. Although not illustrated in FIG. 6, the second opening area 670 may include a plurality of openings, like the first opening area 570. The plurality of openings may correspond respectively to the second conductive patches 530 of the second antenna module 546. While the plurality of openings 571, 572, 573, 574, and 575 of the first opening area 570 may have a height of the first length L1, the plurality of openings of the second opening area 670 may have a height of a fourth length L4. In yet another embodiment, the fourth length L4 may be various. For example, the fourth length L4 may correspond to about 3.2 mm.

In an embodiment, the electronic device 101 may include a third dielectric material 613 and a fourth dielectric material 614. The third dielectric material 613 may be disposed in the second opening area 670 and form the second side surface 512 of the electronic device 101 together with the second frame 315*b*. The fourth dielectric material 614 may be disposed between the second antenna module 546 and the third dielectric material 613.

According to another embodiment, the third dielectric material 613 may have a higher dielectric constant than the fourth dielectric material 614. For example, the third dielectric constant of the third dielectric material 613 may have an appropriate value between about 5.5 and 10, and the fourth dielectric constant of the fourth dielectric material 614 may have an appropriate value between about 2 and 4.

According to yet another embodiment, an RF signal transmitted and/or received as the second wireless communication circuit 552 feeds power to the second conductive patches 530 may pass through the third dielectric material 613 and the fourth dielectric material 614. As the transmitted and/or received RF signal passes through the third dielectric material 613 and the fourth dielectric material 614, the electronic device 101 may secure a higher antenna gain and a wider antenna coverage compared to the case in which the RF signal passes through the fourth dielectric material 614.

Figure 7:
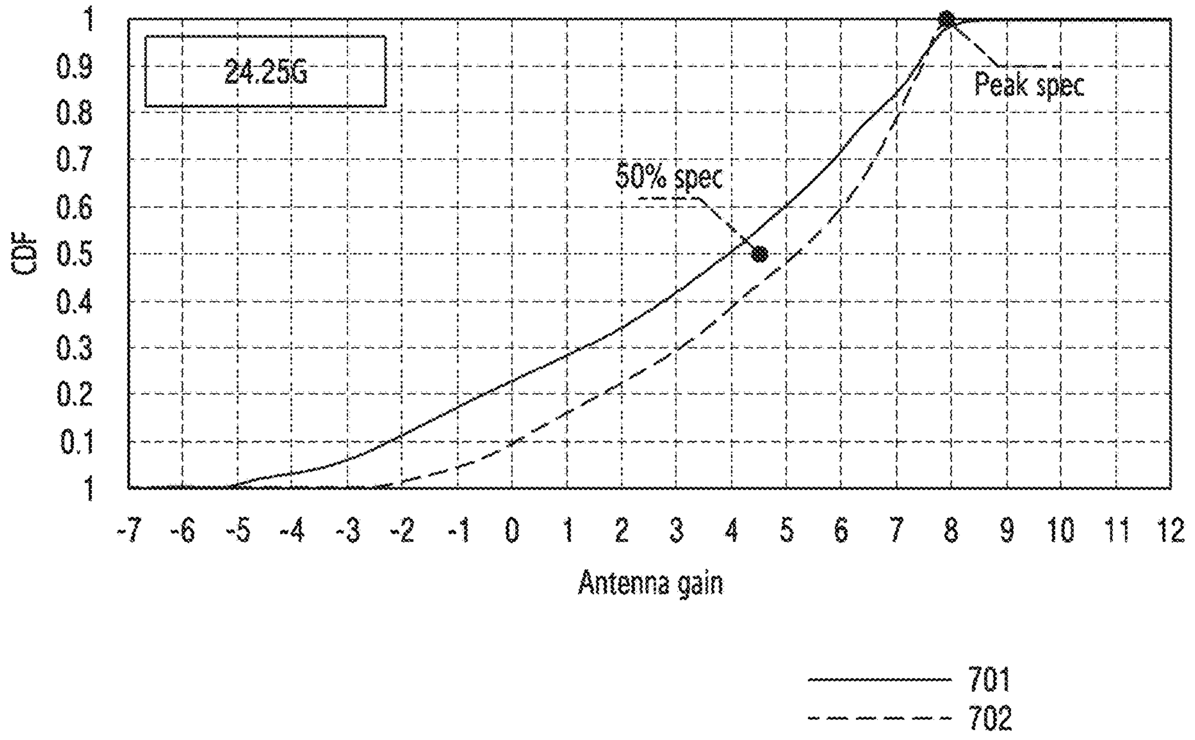
FIG. 7 is a view showing, in comparison, antenna gains in the case in which a single dielectric material is disposed between the first opening area and the first antenna module and in the case in which a first dielectric material is disposed in the first opening area and a second dielectric material is disposed between the first opening area and the first antenna module according to an embodiment of the disclosure.

FIG. 7 is a view showing, in comparison, an antenna gain in the case in which a single dielectric material having a dielectric constant of about 2 to 4 is disposed between the first opening area and the first antenna module and an antenna gain in the case in which a first dielectric material is disposed in the first opening area and a second dielectric material is disposed between the first dielectric material and the first antenna module according to an embodiment of the disclosure.

Referring to FIG. 7, the first graph 701 according to an embodiment illustrates a cumulative distribution in an about 24.25 GHz band depending on an antenna gain in the case in which a single dielectric material (e.g., the second dielectric material 612) having a dielectric constant between about 2 and 4 between the first opening area 570 and the first antenna module 346. In another embodiment, the second graph 702 illustrates a cumulative distribution in an about 24.25 GHz band depending on an antenna gain in the case in which the first dielectric material 611 is disposed in the first opening area 570 and the second dielectric material 612 having a dielectric constant between about 2 to 4 between the first dielectric material 611 and the first antenna module 346.

Table 1 shows the antenna gains in the 24.25 GHz band depending on a cumulative distribution probability.

TABLE 1

| | When single dielectric material having dielectric constant between about 2 and 4 is disposed (e.g., second dielectric material) | When first dielectric material and second dielectric material are disposed |
|---|---|---|
| Max. | 8.4 | 8.0 |
| 50% | 3.9 | 5.1 |
| 20% | −0.6 | 1.6 |

Referring to Table 1, when the cumulative probability values in the first graph 701 and the second graph 702 are 50% of the maximum, the first graph 701 has an antenna gain value of 3.9, and the second graph 702 has an antenna gain value of 5.1. In addition, when the cumulative probability values in the first graph 701 and the second graph 702 are 20% of the maximum, the first graph 701 has an antenna gain value of –0.6, and the second graph 702 has an antenna gain value of 1.6.

Accordingly, when the first dielectric material 611 is disposed in the first opening area 570 and the second dielectric material 612 is disposed between the first dielectric material 611 and the first antenna module 346, it is possible for the electronic device 101 to secure a relatively higher antenna gain in a predetermined frequency band (e.g., 25.25 GHz) compared to the case in which a single dielectric material (e.g., the second dielectric material 612) having a dielectric constant between about 2 to 4. In yet another embodiment, it has been described that the dielectric constant of the single dielectric material has a value between about 2 and 4, but this is merely an example. The dielectric constant of the single dielectric material may have various values under a condition in which the single dielectric material has a lower dielectric constant compared to the first dielectric material 611.

Figure 8:
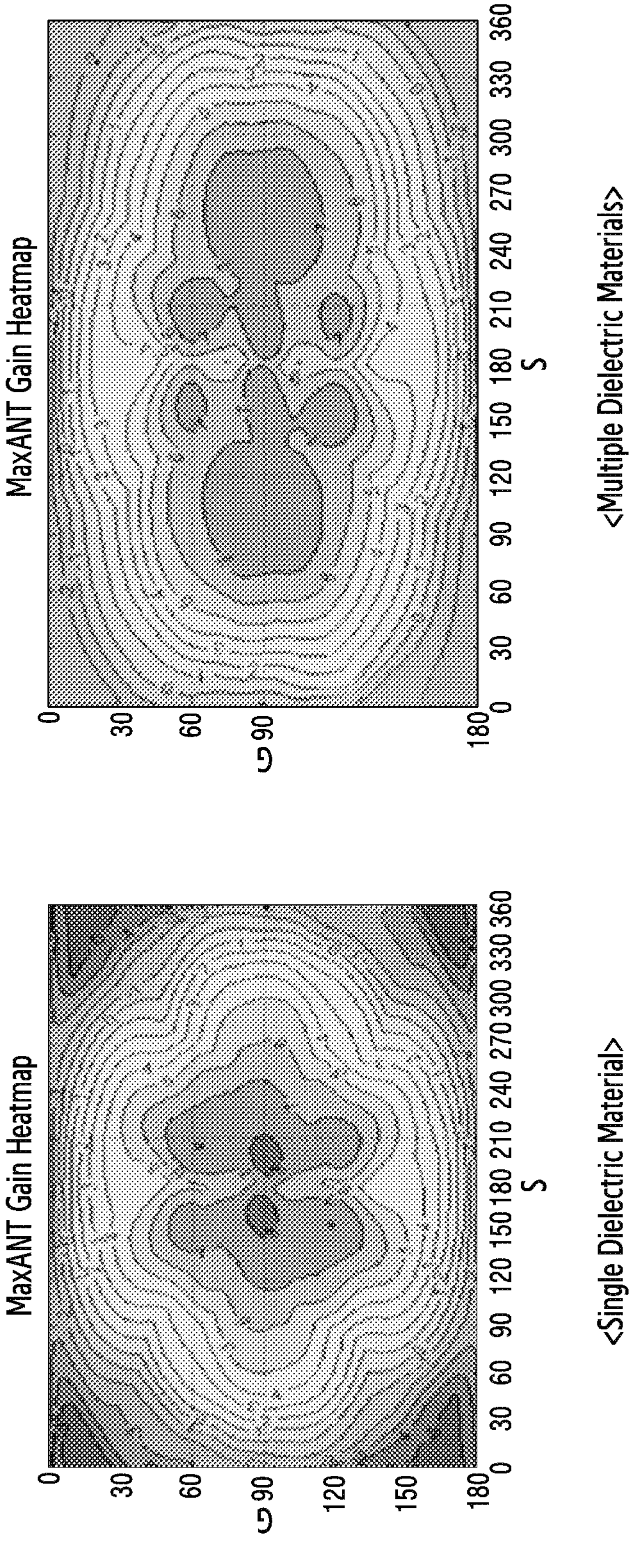
FIG. 8 is view showing, in comparison, antenna coverages in a 24.25 GHZ band in the case in which a single dielectric material having a dielectric constant lower than that of a first dielectric material is disposed between the first opening area and the first antenna module and in the case in which a first dielectric material is disposed in the first opening area and a second dielectric material is disposed between the first dielectric material and the first antenna module according to an embodiment of the disclosure.

FIG. 8 is view showing, in comparison, antenna coverages in the about 24.25 GHz band in the case in which a single dielectric material having a dielectric constant lower than that of the first dielectric material is disposed between the first opening area and the first antenna module and in the case in which a first dielectric material is disposed in the first opening area and a second dielectric material is disposed between the first dielectric material and the first antenna module according to an embodiment of the disclosure.

Referring to FIG. 8, in the case in which the first dielectric material 611 is disposed in the first opening area 570 according to an embodiment, and the second dielectric material 612 is disposed between the first dielectric material 611 and the first antenna module 346, it is possible for the electronic device 101 to secure a wider antenna coverage in the 24.25 GHz band compared to the case in which a single dielectric material having a lower dielectric constant than the first dielectric material 611.

Figure 9:
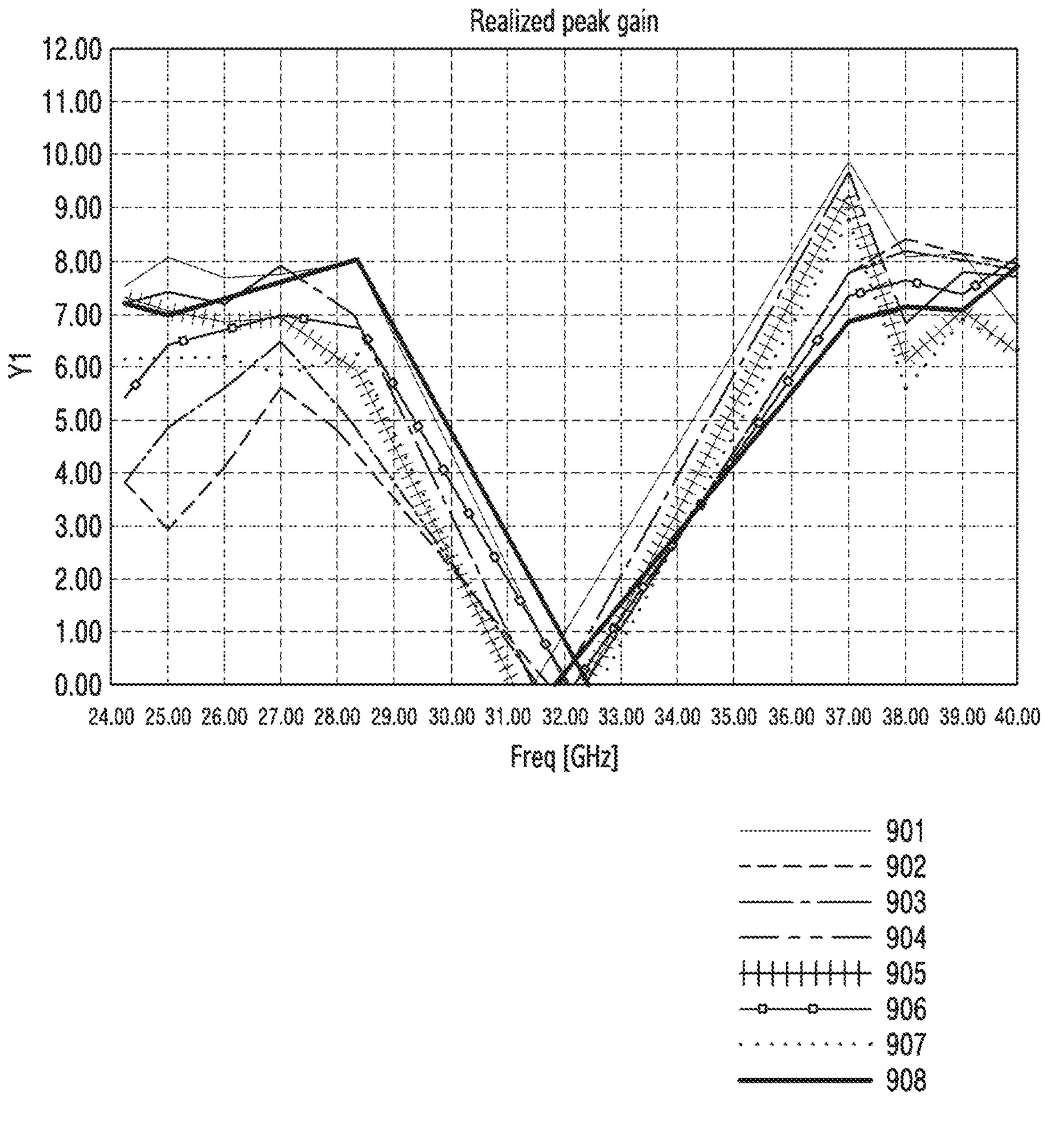
FIG. 9 is a view illustrating antenna gains depending on a change in the dielectric constant of a dielectric material disposed in the first opening area according to an embodiment of the disclosure.

FIG. 9 is a view illustrating antenna gains depending on a change in the dielectric constant of a dielectric material disposed in the first opening area according to an embodiment of the disclosure.

Referring to FIG. 9, the first graph 901 according to an embodiment illustrates the antenna gain of an RF signal having a vertical polarization characteristic when the first dielectric constant of the first dielectric material 611 disposed in the first opening area 570 is about 3.6. The second graph 902 illustrates the antenna gain of an RF signal having a horizontal polarization characteristic when the first dielectric constant of the first dielectric material 611 disposed in the first opening area 570 is about 3.6. FIG. 9 illustrates the cases in which the first dielectric constant of the first dielectric material 611 is about 3.6, but this is for comparing antenna gains depending on a change in dielectric constant. The first dielectric constant of the first dielectric material 611 may actually have an appropriate value between about 5.5 and 10.

In another embodiment, the third graph 903 illustrates the antenna gain of an RF signal having a vertical polarization characteristic when the first dielectric constant of the first dielectric material 611 disposed in the first opening area 570 is about 6. The fourth graph 904 illustrates the antenna gain of an RF signal having a horizontal polarization characteristic when the first dielectric constant of the first dielectric material 611 disposed in the first opening area 570 is about 6.

In yet another embodiment, the fifth graph 905 illustrates the antenna gain of an RF signal having a vertical polarization characteristic when the first dielectric constant of the first dielectric material 611 disposed in the first opening area 570 is about 8. The sixth graph 906 illustrates the antenna gain of an RF signal having a horizontal polarization characteristic when the first dielectric constant of the first dielectric material 611 disposed in the first opening area 570 is about 8.

In an embodiment, the seventh graph 907 illustrates the antenna gain of an RF signal having a vertical polarization characteristic when the first dielectric constant of the first dielectric material 611 disposed in the first opening area 570 is about 10. The eighth graph 908 illustrates the antenna gain of an RF signal having a horizontal polarization characteristic when the first dielectric constant of the first dielectric material 611 disposed in the first opening area 570 is about 10.

Table 2 shows the minimum antenna gain values of RF signals having horizontal and vertical polarization characteristics in a predetermined frequency band (e.g., n258, n261, or n260) depending on a dielectric constant. In another embodiment, n258 may mean a 26 GHz frequency band (e.g., about 26.5 to 29.5 GHZ), n261 may mean a 28 GHz frequency band (e.g., about 27.5 to 28.35 GHZ), and n260 may mean a 39 GHz frequency band (e.g., about 37 to 40 GHZ).

TABLE 2

| Dielectric constant | n258 (horizontal) | n258 (vertical) | n261 (horizontal) | n261 (vertical) | n260 (horizontal) | n260 (vertical) |
|---|---|---|---|---|---|---|
| 3.6 | 3.0 | 7.5 | 4.5 | 7.7 | 7.8 | 6.8 |
| 6 | 3.8 | 7.2 | 4.9 | 6.9 | 7.8 | 6.8 |
| 8 | 5.4 | 6.9 | 6.7 | 5.9 | 7.3 | 6.1 |
| 10 | 7.0 | 5.9 | 7.8 | 6.1 | 6.9 | 5.6 |

Referring to Table 2, in the case of a frequency band lower than the about 28 GHz frequency band, as the first dielectric constant of the first dielectric material 611 disposed in the first opening area 570 according to yet another embodiment increases, the minimum antenna gain of the RF signal having a horizontal polarization characteristic may increase, and as the first dielectric constant of the first dielectric material 611 increases, the minimum antenna gain of the RF signal having a vertical polarization characteristic may decrease. However, it may be seen that even if the minimum antenna gain of the RF signal having a vertical polarization characteristic decreases as the first dielectric constant of the first dielectric material 611 increases, the minimum antenna gain still has a value of 5 or more. For example, in the case of a frequency band lower than the about 28 GHz frequency band, the minimum antenna gain of an RF signal having a vertical polarization characteristic and the minimum antenna gain of an RF signal having a horizontal polarization characteristic may have a trade-off relationship. As another example, in the case of an about 39 GHz frequency band, as the first dielectric constant of the first dielectric material 611 disposed in the first opening area 570 according to an embodiment increases, the minimum antenna gain of the RF signal having a vertical polarization characteristic and the minimum antenna gain of the RF signal having a horizontal polarization characteristic may decrease.

Figure 10:
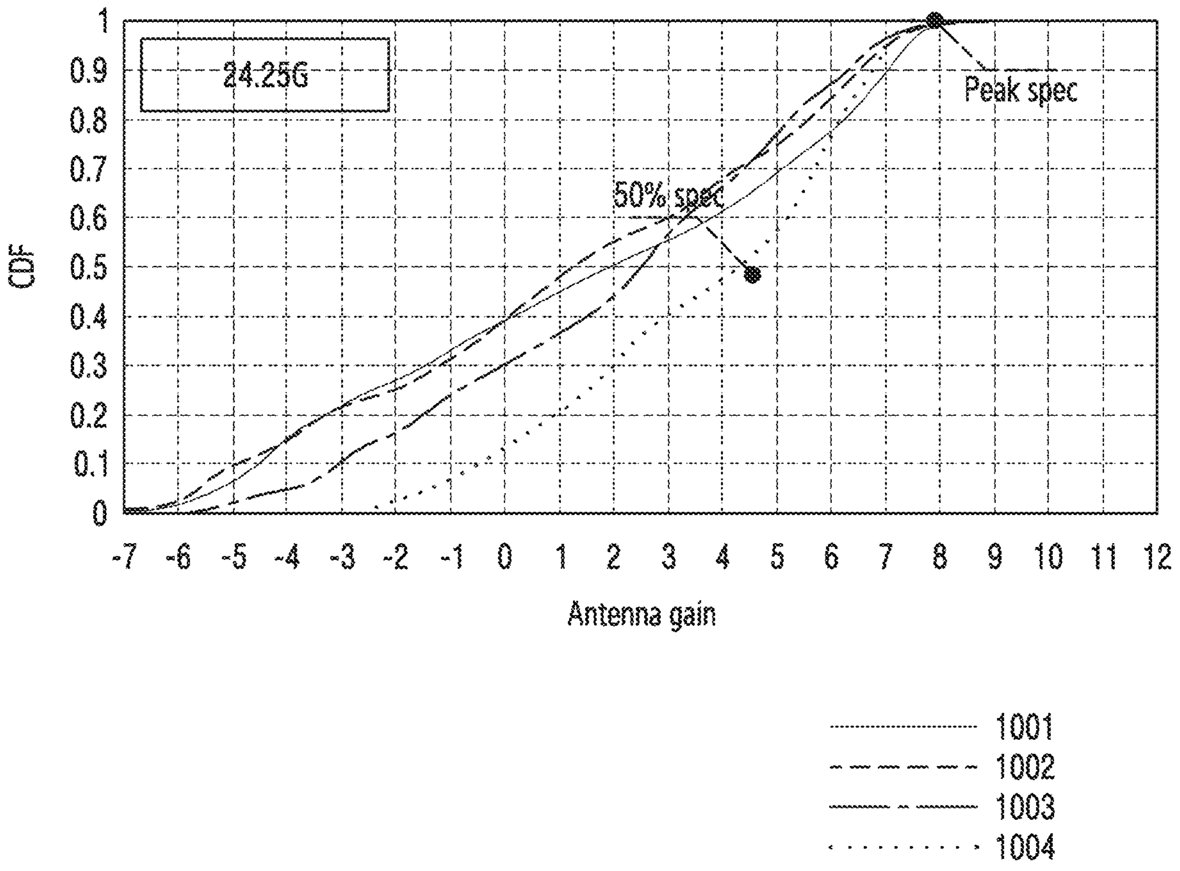
FIG. 10 illustrates cumulative distribution functions of antenna gains depending on a change in dielectric constant in the 24.25 GHz band according to an embodiment of the disclosure.

FIG. 10 illustrates cumulative distribution functions of antenna gains depending on a change in dielectric constant in the 24.25 GHz band according to an embodiment of the disclosure.

Referring to FIG. 10, the first graph 1001 according to an embodiment is a cumulative distribution function of an antenna gain when the first dielectric constant of the first dielectric material 611 disposed in the first opening area 570 is about 3.6, the second graph 1002 according to another embodiment is a cumulative distribution function of an antenna gain when the first dielectric constant of the first dielectric material 611 disposed in the first opening area 570 is about 6, the third graph 1003 according to yet another embodiment is a cumulative distribution function of an antenna gain when the first dielectric constant of the first dielectric material 611 disposed in the first opening area 570 is about 8, and the fourth graph 1004 according to an embodiment is a cumulative distribution function of an antenna gain when the first dielectric constant of the first dielectric material 611 disposed in the first opening area 570 is about 10.

Table 3 shows antenna gains in the first graph 1001, the second graph 1002, the third graph 1003, and the fourth graph 1004 when the cumulative probability value is the maximum in the 24.25 GHz band, when the cumulative probability value is 50%, and when the cumulative probability value is 20% of the maximum.

TABLE 3

| | 1st graph 1001 | 2nd graph 1002 | 3rd graph 1003 | 4th graph 1004 |
|---|---|---|---|---|
| Max. | 8.4 | 8.2 | 8.3 | 7.4 |
| 50% | 1.9 | 1.2 | 2.4 | 4.2 |
| 20% | −3.4 | −3.4 | −1.6 | 0.8 |

Referring to Table 3, when the cumulative probability value is 50% of the maximum, the antenna gain value in the first graph 1001 is 1.9, the antenna gain value in the second graph 1002 is 1.2, the antenna gain value in the third graph 1003 is 2.4, and the antenna gain value in the fourth graph 1004 is 4.2. Accordingly, it may be seen that, in the 24.25 GHz frequency band, the antenna gain value when the cumulative probability value is 50% of the maximum increases as the first dielectric constant of the first dielectric material 611 disposed in the first opening area 570 increases. As another example, when the cumulative probability value is 20% of the maximum, the antenna gain value in the first graph 1001 is −3.4, the antenna gain value in the second graph 1001 is −3.4, the antenna gain value in the third graph 1003 is −1.6, and the antenna gain value in the fourth graph 1001 is 0.8. It may be seen that the antenna gain value when the cumulative probability value is 20% of the maximum increases as the first dielectric constant of the first dielectric material 611 increases. Accordingly, it is possible for the electronic device 101 to secure a relatively high antenna gain at 24.25 GHz by increasing the first dielectric constant of the first dielectric material 611 disposed in the first opening area 570.

Figure 11:
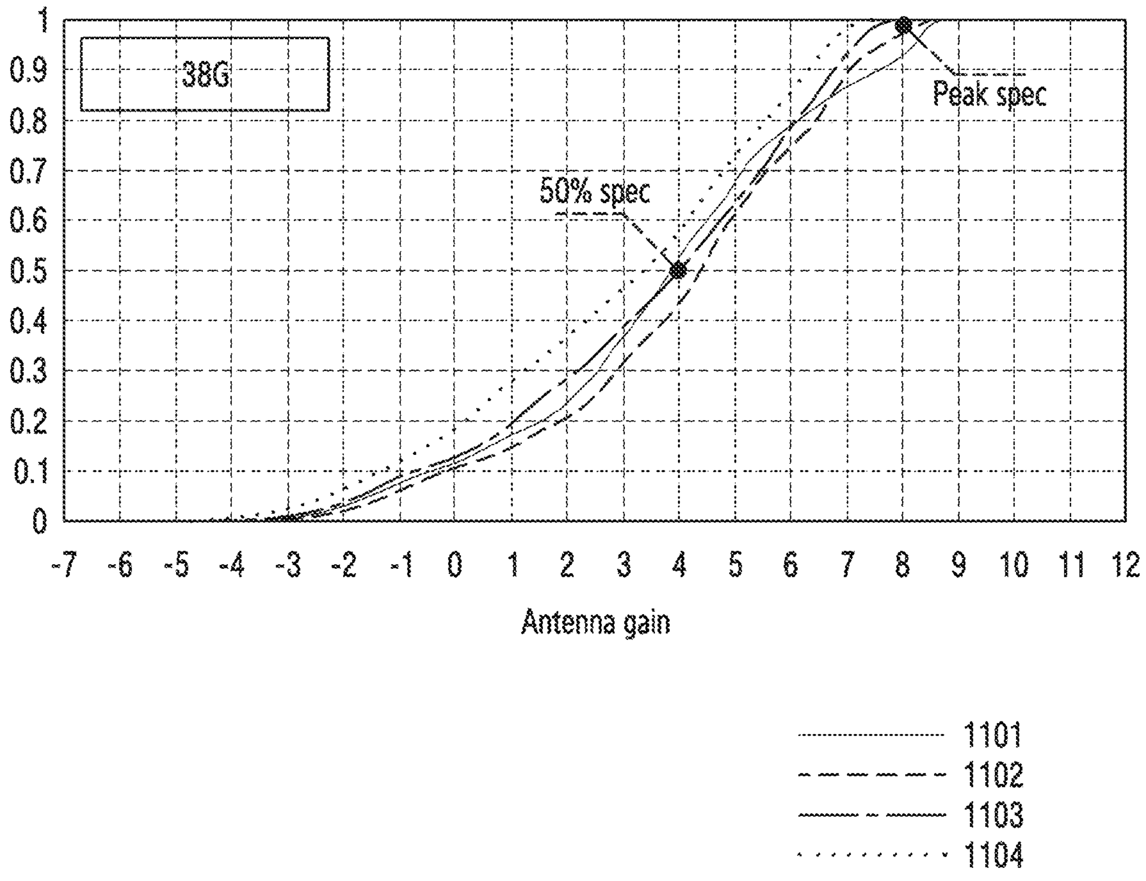
FIG. 11 illustrates cumulative distribution function graphs of antenna gains in a 38 GHz band according to an embodiment of the disclosure.

FIG. 11 illustrates cumulative distribution functions of antenna gains in a 38 GHz band according to an embodiment of the disclosure.

Referring to FIG. 11, the first graph 1101 according to an embodiment is a cumulative distribution function of an antenna gain when the first dielectric constant of the first dielectric material 611 disposed in the first opening area 570 is about 3.6, the second graph 1102 according to another embodiment is a cumulative distribution function of an antenna gain when the dielectric constant of the first dielectric material 611 disposed in the first opening area 570 is about 6, the third graph 1103 according to yet another embodiment is a cumulative distribution function of an antenna gain when the first dielectric constant of the first dielectric material 611 disposed in the first opening area 570 is about 8, and the fourth graph 1104 according to an embodiment is a cumulative distribution function of an antenna gain when the first dielectric constant of the first dielectric material 611 disposed in the first opening area 570 is about 10.

Table 4 shows antenna gains in the first graph 1101, the second graph 1102, the third graph 1103, and the fourth graph 1104 when the cumulative probability value is the maximum in the 38 GHz band, when the cumulative probability value is 50%, and when the cumulative probability value is 20% of the maximum.

TABLE 4

| | 1st graph 1101 | 2nd graph 1102 | 3rd graph 1103 | 4th graph 1104 |
|---|---|---|---|---|
| Max. | 8.7 | 8.4 | 7.7 | 7.2 |
| 50% | 3.8 | 4.3 | 3.9 | 3.3 |
| 20% | 1.4 | 1.8 | 1.0 | 0.1 |

Referring to Table 4, when the cumulative probability is 50% of the maximum, the antenna gain value in the first graph 1101 is 3.8, the antenna gain value in the second graph 1102 is 4.3, the antenna gain value in the third graph 1103 is 3.9, and the antenna gain value in the fourth graph 1104 is 3.3. Accordingly, it may be seen that, in the 38 GHz frequency band, the antenna gain value when the cumulative probability value is 50% of the maximum increases as the first dielectric constant of the first dielectric material 611 disposed in the first opening area 570 decreases. Accordingly, as the first dielectric constant of the first dielectric material 611 disposed in the first opening area 570 decreases, the electronic device 101 may secure a relatively high antenna gain at 38 GHz.

As a result, referring to the graphs 1001, 1002, 1003, 1004, 1101, 1102, 1103, and 1104 illustrated in FIGS. 10 and 11, the change in an antenna gain value depending on a change in the first dielectric constant of the first dielectric material 611 disposed in the first opening area 570 may vary depending on a frequency band. For example, in the 24.25 GHz frequency band, as the first dielectric constant of the first dielectric material 611 increases, the antenna gain when the antenna gain is 50% of the maximum may increase. For example, in the 38 GHz frequency band, as the first dielectric constant of the first dielectric material 611 decreases, the antenna gain when the antenna gain is 50% of the maximum may increase.

Figure 12:
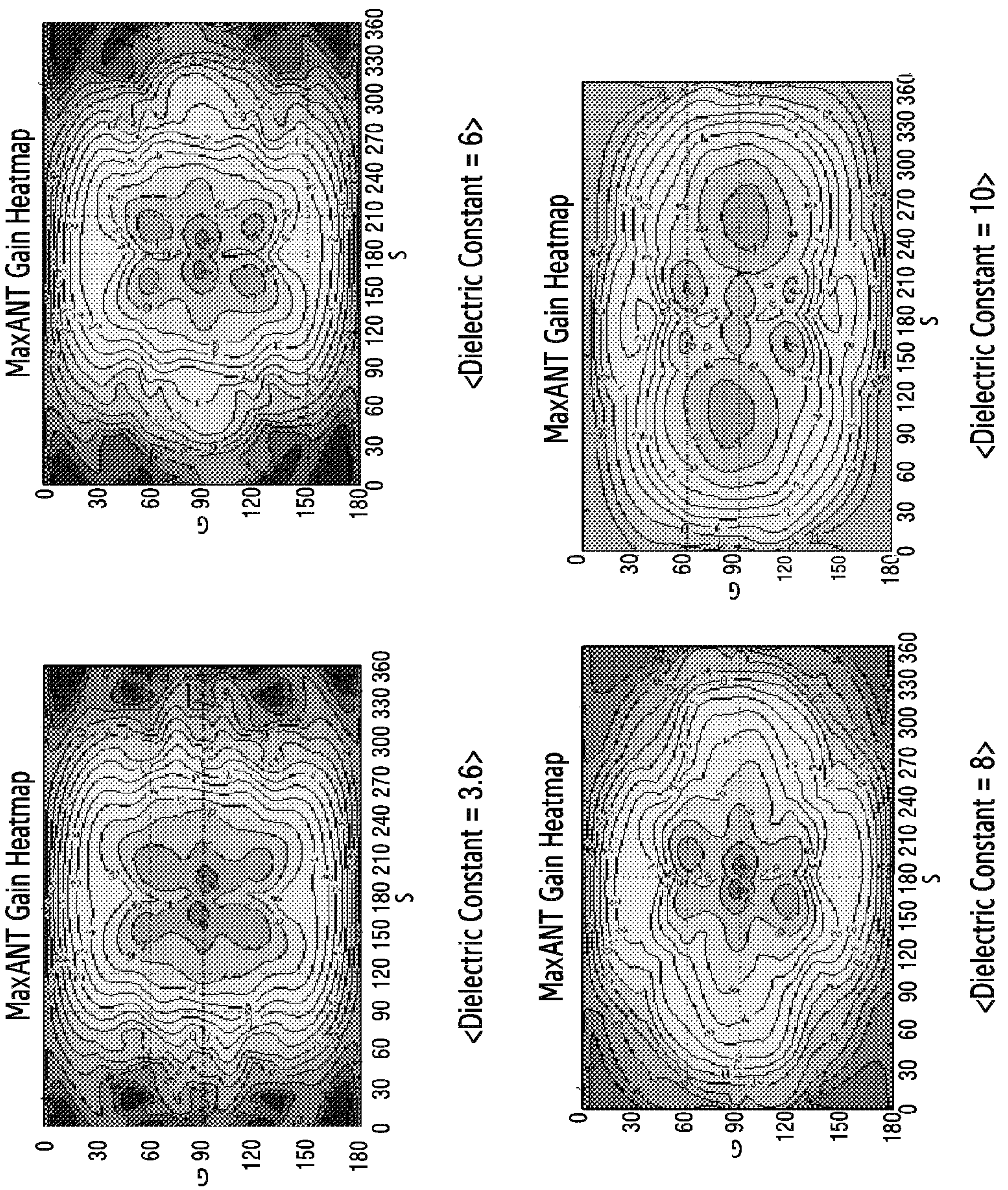
FIG. 12 illustrates heat maps of antenna gains in the 24.25 GHz band depending on a change in the first dielectric constant of a first dielectric material disposed in the first opening area according to an embodiment of the disclosure.

FIG. 12 illustrates heat maps of antenna gains in the 24.25 GHz band depending on a change in the first dielectric constant of a first dielectric material disposed in the first opening area according to an embodiment of the disclosure.

Referring to FIG. 12, as the first dielectric constant of the first dielectric material 611 disposed in the first opening area 570 according to an embodiment increases, the antenna gain in the about 24.25 GHz band may increase, and accordingly, the antenna coverage may be widened. For example, when the first dielectric constant of the first dielectric material 611 is about 6, the electronic device 101 may have a wider antenna coverage in the about 24.25 GHz band compared to the case in which the first dielectric constant is about 3.6. As another example, when the first dielectric constant of the first dielectric material 611 is about 8, the electronic device 101 may have a wider antenna coverage in the about 24.25 GHz band compared to the case in which the first dielectric constant is about 6. As another example, when the first dielectric constant of the first dielectric material 611 is about 10, the electronic device 101 may have a wider antenna coverage in the about 24.25 GHz band compared to the case in which the first dielectric constant is about 8.

Figure 13:
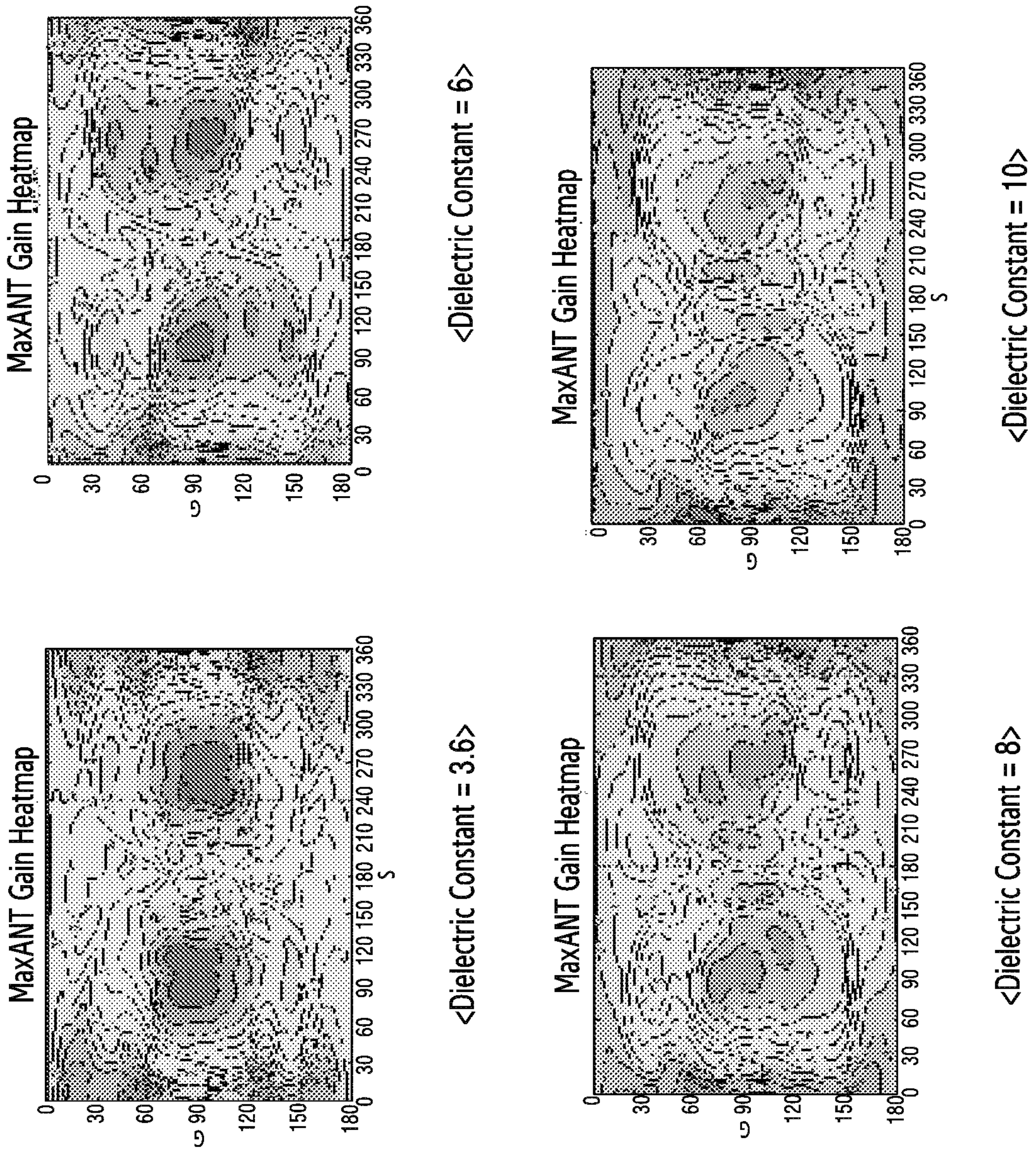
FIG. 13 illustrates heat maps of antenna gains in the 38 GHz band depending on a change in the first dielectric constant of a first dielectric material disposed in the first opening area according to an embodiment of the disclosure.

FIG. 13 illustrates heat maps of antenna gains in the 38 GHz band depending on a change in the first dielectric constant of a first dielectric material disposed in the first opening area according to an embodiment of the disclosure.

Referring to FIG. 13, as the first dielectric constant of the first dielectric material 611 disposed in the first opening area 570 according to an embodiment decreases, the antenna gain in the about 38 GHz band may increase, and accordingly, the antenna coverage may be widened. For example, when the dielectric constant of the first dielectric material 611 is about 8, the electronic device 101 may have a wider antenna coverage in the about 38 GHz band compared to the case in which the first dielectric constant is about 10. As another example, when the first dielectric constant of the first dielectric material 611 is about 6, the electronic device 101 may have a wider antenna coverage in the about 38 GHz band compared to the case in which the first dielectric constant is about 8. As another example, when the first dielectric constant of the first dielectric material 611 is about 3.6, the electronic device 101 may have a wider antenna coverage in the about 38 GHz band compared to the case in which the first dielectric constant is about 6.

Figure 14:
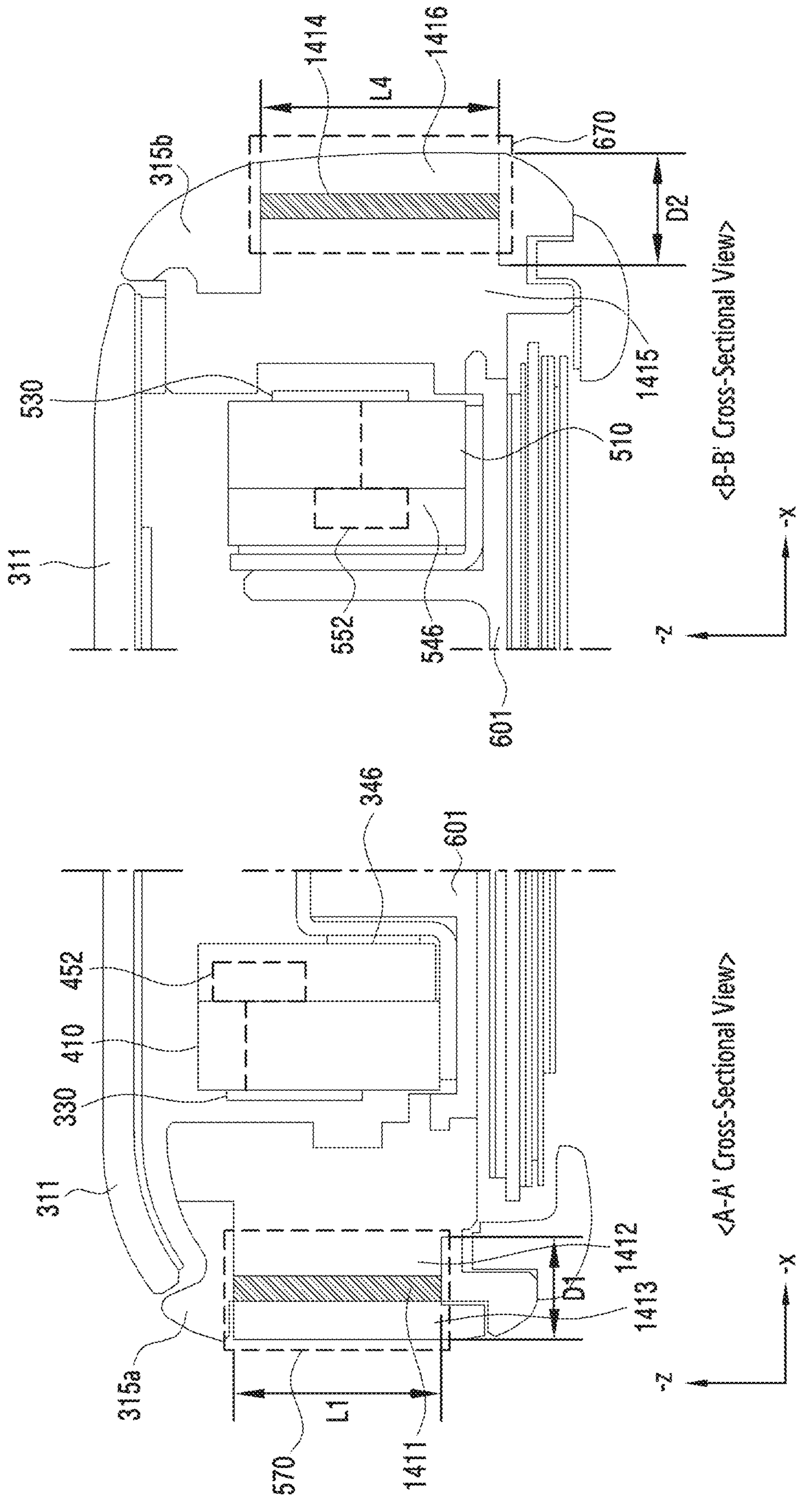
FIG. 14 is a view illustrating dielectric materials disposed between the opening area and the antenna module according to an embodiment of the disclosure.

FIG. 14 is a view illustrating dielectric materials disposed between the opening area and the antenna module according to an embodiment of the disclosure.

Referring to FIG. 14, the electronic device 101 according to an embodiment may include a first dielectric material 1411, a second dielectric material 1412, and a third dielectric material 1413. In another embodiment, the first dielectric material 1411 may be disposed in at least a portion of the first opening area 570. The first dielectric constant of the first dielectric material 1411 may have an appropriate value between about 5.5 and 10. In yet another embodiment, a plurality of openings of the first opening area 570 (e.g., the plurality of openings 571, 572, 573, 574, and 575 in FIG. 5C) may have a predetermined depth D1, and the first dielectric material 1411 may have a predetermined thickness of 1/10 or more of the predetermined depth D1 and may be disposed in the first opening area 570. For example, the first dielectric material 1411 may have a thickness of about 0.5 mm and may be disposed in the first opening area 570.

According to an embodiment, the second dielectric material 1412 may be disposed between the first dielectric material 1411 and the first antenna module 346. In another embodiment, the second dielectric constant 1412 may have a second dielectric constant lower than the first dielectric constant (e.g., about 5.5 to 10) of the first dielectric material 1411. For example, the first dielectric constant of the first dielectric material 1411 may have an appropriate value between about 5.5 and 10 (e.g., about 7 or about 9), and the second dielectric constant of the second dielectric material 1412 may have an appropriate value between 2 and 4 (e.g., about 3.6).

According to yet another embodiment, the third dielectric material 1413 may be disposed in the first opening area 570, and may be disposed in a first direction from the first antenna module 346 toward the first opening area 570 with respect to the first dielectric material 1411 (e.g., the +x direction). For example, the first dielectric material 1411 may be located between the third dielectric material 1413 and the second dielectric material 1412. In an embodiment, the third dielectric material 1413 may be disposed in the first opening area 570 to form the first side surface 511 of the electronic device 101 together with the first frame 315*a*.

In another embodiment, the third dielectric constant of the third dielectric material 1413 may be lower than the first dielectric constant of the first dielectric material 1411. In yet another embodiment, the third dielectric constant of the third dielectric material 1413 may be substantially the same as the second dielectric constant of the second dielectric material 1412, but is not limited thereto. The third dielectric constant may be different from the second dielectric constant of the second dielectric material 1412 in a range in which the third dielectric constant is lower than the first dielectric constant.

According to an embodiment, an RF signal transmitted and/or received as the first wireless communication circuit 452 feeds power to the first conductive patches 330 may pass through the first dielectric material 1411, the second dielectric material 1412, and the third dielectric material 1413. As the transmitted and/or received RF signal passes through the first dielectric material 1411, the second dielectric material 1412, and the third dielectric material 1413, the electronic device 101 may secure a higher antenna gain and wider antenna coverage compared to the case in which the RF signal passes through a single dielectric material having a dielectric constant lower than the first dielectric constant of the first dielectric material 1411.

For example, an RF signal transmitted and/or received by the electronic device 101 may have a vertical polarization characteristic and a horizontal polarization characteristic. When the first dielectric material 1411, the second dielectric material 1412, and the third dielectric material 1413 are not disposed, in order for the RF signal to be transmitted to and/or received from the exterior of the electronic device 101 by the first antenna module 346, the radiation loss may be reduced only when the first length L1, which is the height of the plurality of openings 571, 572, 573, 574, and 575 provided in the first frame 315*a*, is greater than the ½ wavelength of the first signal (λ/2) of the RF signal that has a horizontal polarization characteristic. When the first dielectric material 1411, the second dielectric material 1412, and the third dielectric material 1413 are not disposed, the radiation loss may be reduced only when the first length L2, which is the width of the plurality of openings 571, 572, 573, 574, and 575 provided in the first frame 315*a*, is greater than the ½ wavelength of the second signal (λ/2) of the RF signal that has a vertical polarization characteristic.

However, the first dielectric material 1411, the second dielectric material 1412, and the third dielectric material 1413 are disposed in the first open area 570 and between the first opening area 570 and the first antenna module 346, the RF signal may pass through the plurality of the openings 571, 572, 573, 574, and 575 and the antenna radiation loss may be reduced even when the first length L1 which is the height of the plurality of the openings 571, 572, 573, 574, and 575 and/or the second length L2 which is the width of the plurality of the openings 571, 572, 573, 574, and 575 are smaller than the ½ wavelength of the RF signal (λ/2).

Accordingly, the electronic device 101 may secure a high antenna gain and a wider antenna coverage by disposing the first dielectric material 1411, the second dielectric material 1412, and the third dielectric material 1413 in the first opening area 570 and between the first opening area 570 and the first antenna module 346.

The electronic device 101 according to another embodiment may include a fourth dielectric material 1414, a fifth dielectric material 1415, and/or a sixth dielectric material 1416. According to yet another embodiment, the second frame 315*b* may include a second opening area 670 in one area thereof. Although not illustrated in FIG. 14, the second opening area 670 may include a plurality of openings, like the first opening area 570. The plurality of openings may correspond respectively to the second conductive patches 530 of the second antenna module 546. While the plurality of openings 571, 572, 573, 574, and 575 of the first opening area 570 may have a height of the first length L1, the plurality of openings of the second opening area 670 may have a height of a fourth length L4. In an embodiment, the fourth length L4 may be various. For example, the fourth length L4 may correspond to about 3.2 mm.

In another embodiment, the fourth dielectric material 1414 may be disposed in at least a portion of the second opening area 670. The fourth dielectric constant of the fourth dielectric material 1414 may have an appropriate value between about 5.5 and 10. In yet another embodiment, the plurality of openings of the second opening area 670 may have a predetermined depth D2, and the fourth dielectric material 1414 may have a predetermined thickness of 1/10 or more of the predetermined depth D2 and may be disposed in the second opening area 670. For example, the fourth dielectric material 1414 may have a thickness of about 0.4 mm and may be disposed in the second opening area 670.

According to an embodiment, the fifth dielectric material 1415 may be disposed between the fourth dielectric material 1414 and the second antenna module 546. In another embodiment, the fifth dielectric constant 1415 may have a fifth dielectric constant lower than the fourth dielectric constant (e.g., about 5.5 to 10) of the fourth dielectric material 1414. For example, the fourth dielectric constant of the fourth dielectric material 1414 may have an appropriate value between about 5.5 and 10, and the fifth dielectric constant of the fifth dielectric material 1415 may have an appropriate value between about 2 and 4.

According to yet another embodiment, the sixth dielectric material 1416 may be disposed in the second opening area 670, and may be disposed in a second direction from the second antenna module 546 toward the second opening area 670 with respect to the fourth dielectric material 1414 (e.g., the −x direction). For example, the fourth dielectric material 1414 may be located between the sixth dielectric material 1416 and the fifth dielectric material 1415. In an embodiment, the sixth dielectric material 1416 may be disposed in the second opening area 670 to form the second side surface 512 of the electronic device 101 together with the second frame 315*b*.

According to another embodiment, an RF signal transmitted and/or received as the second wireless communication circuit 552 feeds power to the second conductive patches 530 may pass through the fourth dielectric material 1414, the fifth dielectric material 1415, and the sixth dielectric material 1416. As the transmitted and/or received RF signal passes through the fourth dielectric material 1414, the fifth dielectric material 1415, and the sixth dielectric material 1416, the electronic device 101 may secure a higher antenna gain and wider antenna coverage compared to the case in which the RF signal passes through a single dielectric material having a dielectric constant lower than the fourth dielectric constant.

Figure 15:
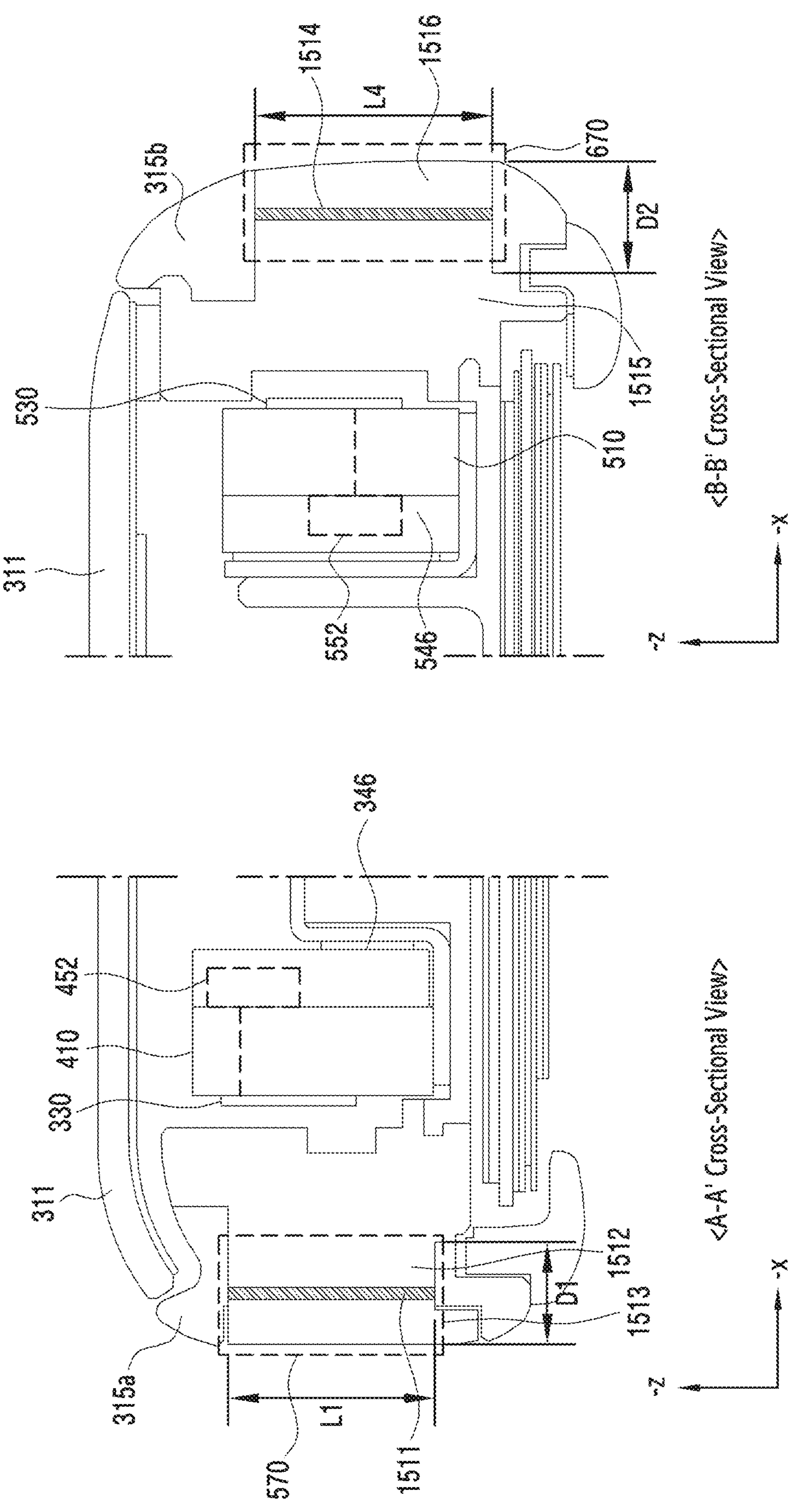
FIG. 15 is a view illustrating dielectric materials disposed between the opening area and the antenna module according to an embodiment of the disclosure.

FIG. 15 is a view illustrating dielectric materials disposed between the opening area and the antenna module according to an embodiment of the disclosure.

Referring to FIG. 15, the first dielectric material 1511 according to an embodiment may have a relatively small thickness compared to the first dielectric material 1411 of FIG. 14. For example, the first dielectric material 1511 may have a thickness of about 0.2 mm and may be disposed in the first opening area 570. However, the first dielectric material 1511 may still have a thickness equal to or greater than 1/10 of the depth D1 of the plurality of openings 571, 572, 573, 574, and 575 included in the first opening area 570. In another embodiment, the second dielectric material 1512 and the third dielectric material 1513 substantially correspond to the second dielectric material 1412 and the third dielectric material 1413 of FIG. 14, and a description thereof will be omitted.

According to yet another embodiment, the fourth dielectric material 1514 of FIG. 15 may have a relatively small thickness compared to the fourth dielectric material 1414 of FIG. 14. For example, the fourth dielectric material 1514 may have a thickness of about 0.2 mm and may be disposed in the second opening area 670. However, the fourth dielectric material 1514 may still have a thickness equal to or greater than 1/10 of the depth D2 of the plurality of openings included in the first opening area 670. In an embodiment, the fifth dielectric material 1515 and the sixth dielectric material 1516 substantially correspond to the fifth dielectric material 1415 and the sixth dielectric material 1416 of FIG. 14, and a description thereof will be omitted.

Hereinafter, antenna gains according to frequency bands of various embodiments of the disclosure will be described. For example, the embodiment of the electronic device 101 including the first dielectric material 611, the second dielectric material 612, the third dielectric material 613, and the fourth dielectric material 614 illustrated in FIG. 6 may be referred to as CASE 1. The embodiment of the electronic device 101 including the first dielectric material 1411, the second dielectric material 1412, the third dielectric material 1413, and the fourth dielectric material 1414 illustrated in FIG. 1411 may be referred to as CASE 2. In addition, the embodiment of the electronic device 101 including the first dielectric material 1511 and the fourth dielectric material 1514 that are relatively thinner than those in CASE 2 illustrated in FIG. 15 may be referred to as CASE 3. In an embodiment, the electronic device 101 may include at least one of the components of CASE 1, CASE 2, and CASE 3. For example, the components of CASE 1 (e.g., the first dielectric material 611 or the second dielectric element 612) may be disposed in the first opening area 570 and between the first opening area 570 and the first antenna module 346 of the electronic device 101), and the components of CASE 2 (e.g., the first dielectric material 1411, the second dielectric material 1412, or the sixth element 1416) may be disposed in the second opening area 670 and between second opening area 670 and the second antenna module 546 of the electronic device 101. Accordingly, at least one or a combination of two or more of CASE 1, CASE 2 and CASE 3 may be implemented in the electronic device 101, rather than only one of CASE 1, CASE 2, and CASE 3 is implemented in the electronic device 101.

Table 5 shows the antenna gains of the first antenna module 346 obtained depending on dielectric materials disposed between the first opening area 570 and the first antenna module 346 at 24.25 GHz.

Table 6 shows the antenna gains of the first antenna module 346 obtained depending on dielectric materials disposed between the first opening area 570 and the first antenna module 346 at 27.5 GHz.

Table 7 shows the antenna gains of the first antenna module 346 obtained depending on dielectric materials disposed between the first opening area 570 and the first antenna module 346 at 28 GHz.

Table 8 shows the antenna gains of the first antenna module 346 obtained depending on dielectric materials disposed between the first opening area 570 and the first antenna module 346 at 28.35 GHz.

Table 9 shows the antenna gains of the first antenna module 346 obtained depending on dielectric materials disposed between the first opening area 570 and the first antenna module 346 at 38.5 GHz.

TABLE 5

| | Single dielectric material | CASE 1 | CASE 2 | CASE 3 |
|---|---|---|---|---|
| PEAK | 9.5 | 9.5 | 9.5 | 9.5 |
| 50% | −0.3 | 1.4 | 0.2 | −0.3 |

TABLE 6

| | Single dielectric material | CASE 1 | CASE 2 | CASE 3 |
|---|---|---|---|---|
| PEAK | 9.0 | 9.0 | 9.0 | 9.0 |
| 50% | 1.3 | 2.9 | 3.2 | 2.6 |

TABLE 7

| | Single dielectric material | CASE 1 | CASE 2 | CASE 3 |
|---|---|---|---|---|
| PEAK | 8.5 | 8.5 | 8.5 | 8.5 |
| 50% | 1.3 | 2.5 | 3.0 | 2.7 |

TABLE 8

| | Single dielectric material | CASE 1 | CASE 2 | CASE 3 |
|---|---|---|---|---|
| PEAK | 7.8 | 7.8 | 7.8 | 7.8 |
| 50% | 1.0 | 1.9 | 2.4 | 2.6 |

TABLE 9

| | Single dielectric material | CASE 1 | CASE 2 | CASE 3 |
|---|---|---|---|---|
| PEAK | 10.0 | 9.6 | 10.8 | 10.4 |
| 50% | 3.8 | 2.8 | 3.3 | 3.7 |

Referring to Tables 5, 6, 7, 8, and 9, compared to the case in which a single dielectric material (e.g., the second dielectric material 612) having a dielectric constant of about 3.6 is used between the first opening 570 and the first antenna module 346, CASE 1, CASE 2, and CASE 3 may have relatively high antenna gains in the 24.25 GHz, 27.5 GHZ, 28 GHZ, and 28.35 GHz bands when the cumulative probability is 50% of the maximum. For example, in the 27.5 GHz band, when a single dielectric material is used, the antenna gain is 1.3, and CASE 1, CASE 2, and CASE 3 have antenna gains of 2.9, 3.2, and 2.6 in order, respectively. Accordingly, when a first dielectric material having a relatively high first dielectric constant (e.g., about 5.5 to 10) is disposed in the first opening area 570, and a second dielectric material having a relatively low dielectric constant (e.g., about 2 to 4) is disposed between the first dielectric material and the first antenna module 346, the electronic device 101 may secure a higher antenna gain compared to the case in which a single dielectric material is used.

It may be seen that CASE 2 has a relatively high antenna gain compared to CASE 1 in the 27.5 GHZ, 28 GHZ, 28.35 GHZ, and 38.5 GHz bands (e.g., n261 and n260). For example, in the 27.5 GHz band, CASE 2 has an antenna gain of 3.2, and CASE 1 has an antenna gain of 2.9. As another example, in the 28 GHz band, CASE 2 has an antenna gain of 3.0, and CASE 1 has an antenna gain of 2.5. In case of CASE 2 in which the first dielectric material 1411 is disposed between the second dielectric material 1412 and the third dielectric material 1413 having a dielectric constant lower than the first dielectric constant, the electronic device 101 may secure a higher antenna gain and a wider antenna coverage compared to CASE 1.

Table 10 shows the antenna gains of the second antenna module 546 obtained depending on dielectric materials disposed between the second opening area 670 and the second antenna module 546 at 24.25 GHz.

Table 11 shows the antenna gains of the second antenna module 546 obtained depending on dielectric materials disposed between the second opening area 670 and the second antenna module 546 at 26.5 GHZ.

Table 12 shows the antenna gains of the second antenna module 546 obtained depending on dielectric materials disposed between the second opening area 670 and the second antenna module 546 at 27.5 GHz.

Table 13 shows the antenna gains of the second antenna module 546 obtained depending on dielectric materials disposed between the second opening area 670 and the second antenna module 546 at 28.35 GHz.

Table 14 shows the antenna gains of the second antenna module 546 obtained depending on dielectric materials disposed between the second opening area 670 and the second antenna module 546 at 38.5 GHZ.

TABLE 10

| | Single dielectric material | CASE 1 | CASE 2 | CASE 3 |
|---|---|---|---|---|
| PEAK | 10.1 | 10.1 | 10.1 | 10.1 |
| 50% | 0.0 | 2.2 | 2.0 | 0.7 |

TABLE 11

| | Single dielectric material | CASE 1 | CASE 2 | CASE 3 |
|---|---|---|---|---|
| PEAK | 10.8 | 10.8 | 10.8 | 10.8 |
| 50% | 0.9 | 3.6 | 3.3 | 2.1 |

TABLE 12

| | Single dielectric material | CASE 1 | CASE 2 | CASE 3 |
|---|---|---|---|---|
| PEAK | 10.4 | 10.4 | 10.4 | 10.4 |
| 50% | 1.0 | 3.4 | 3.3 | 2.6 |

TABLE 13

| | Single dielectric material | CASE 1 | CASE 2 | CASE 3 |
|---|---|---|---|---|
| PEAK | 10.0 | 10.0 | 10.0 | 10.0 |
| 50% | 0.6 | 2.6 | 2.6 | 1.9 |

TABLE 14

| | Single dielectric material | CASE 1 | CASE 2 | CASE 3 |
|---|---|---|---|---|
| PEAK | 10.0 | 10.0 | 10.0 | 10.0 |
| 50% | 3.8 | 2.9 | 3.1 | 3.5 |

Referring to Tables 10, 11, 12, 13, and 14, compared to the case in which a single dielectric material having a dielectric constant of about 3.6 is used between the second opening 670 and the second antenna module 546, CASE 1, CASE 2, and CASE 3 may have relatively high antenna gains in the 24.25 GHZ, 26.5 GHZ, 27.5 GHZ, and 28.35 GHz bands when the cumulative probability is 50% of the maximum. For example, in the 27.5 GHz band, when a single dielectric material is used, the antenna gain is 1.0, and CASE 1, CASE 2, and CASE 3 have antenna gains of 3.4, 3.3, and 2.6 in order, respectively. Accordingly, when a fourth dielectric material 1414 having a relatively high fourth dielectric constant (e.g., about 5.5 to 10) is disposed in the second opening area 670, and a fifth dielectric material 1415 having a relatively low dielectric constant (e.g., about 2 to 4) is disposed between the second opening area 670 and the second antenna module 546, the electronic device 101 may secure a higher antenna gain compared to the case in which a single dielectric material is used.

Figure 16:
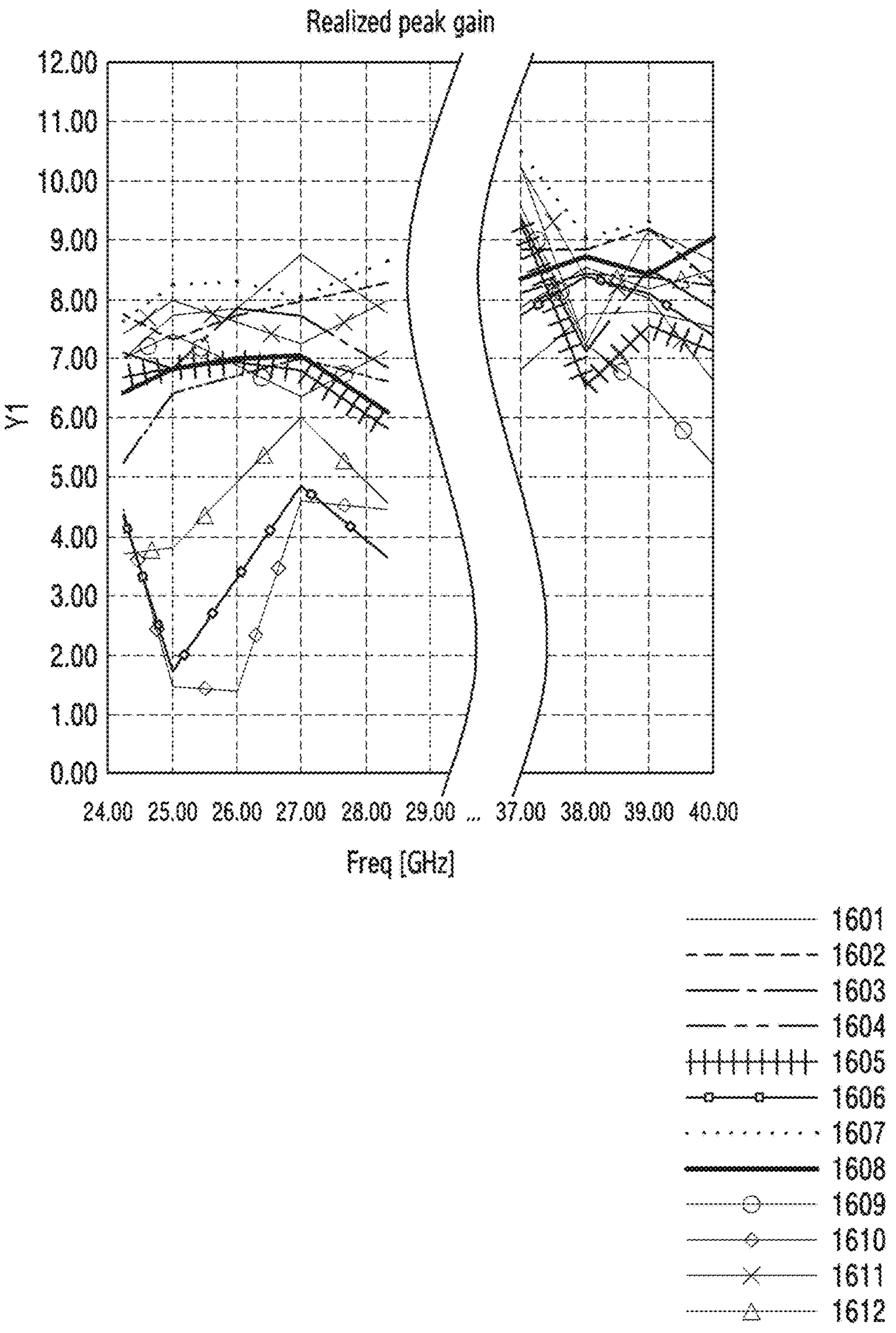
FIG. 16 illustrates antenna gains in a predetermined frequency band depending on the height of the opening according to an embodiment of the disclosure.

FIG. 16 illustrates antenna gains in a predetermined frequency band depending on the height of the opening according to an embodiment of the disclosure.

Referring to FIG. 16, under a common condition in which the first dielectric material 611 and the second dielectric material 612 are disposed between the first opening area 570 and the first antenna module 346 according to an embodiment, an antenna gain for an RF signal having a vertical polarization characteristic when the height of the first opening 571 of the first opening area 570 (e.g., the first length L1) is about 3.5 mm is shown as the first graph 1601, an antenna gain for an RF signal having a horizontal polarization characteristic when the height of the first opening 571 (e.g., the first length L1) is about 3.5 mm is shown as the second graph 1602, an antenna gain for an RF signal having a vertical polarization characteristic when the height of the first opening 571 (e.g., the first length L1) is about 3 mm is shown as the second graph 1603, an antenna gain for an RF signal having a horizontal polarization characteristic when the height of the first opening 571 (e.g., the first length L1) is about 3 mm is shown as the fourth graph 1604, an antenna gain for an RF signal having a vertical polarization characteristic when the height of the first opening 571 (e.g., the first length L1) is about 2.5 mm is shown as the fifth graph 1605, and an antenna gain for an RF signal having a horizontal polarization characteristic when the height of the first opening 571 (e.g., the first length L1) is about 2.5 mm is shown as the sixth graph 1606.

Under a common condition in which a single dielectric material having a dielectric constant lower than the first dielectric constant is disposed between the first opening area 570 and the first antenna module 346, an antenna gain for an RF signal having a vertical polarization characteristic when the height of the first opening 571 of the first opening area 570 (e.g., the first length L1) is about 3.5 mm is shown as the seven graph 1607, an antenna gain for an RF signal having a horizontal polarization characteristic when the height of the first opening 571 (e.g., the first length L1) is about 3.5 mm is shown as the eighth graph 1608, an antenna gain for an RF signal having a vertical polarization characteristic when the height of the first opening 571 (e.g., the first length L1) is about 2.5 mm is shown as the ninth graph 1609, an antenna gain for an RF signal having a horizontal polarization characteristic when the height of the first opening 571 (e.g., the first length L1) is about 2.5 cm is shown as the tenth graph 1610, an antenna gain for an RF signal having a vertical polarization characteristic when the height of the first opening 571 (e.g., the first length L1) is about 3 mm is shown as the eleventh graph 1611, and an antenna gain for an RF signal having a horizontal polarization characteristic when the height of the first opening 571 (e.g., the first length L1) is about 3 mm is shown as the twelfth graph 1612, Table 15 shows the minimum antenna gains depending on a change in the height (e.g., the first length L1) of the first opening 571.

TABLE 15

| | Height of 1st opening area (mm) | 24 to 28.35 GHz (horizontal polarization) | 24 to 28.35 GHz (vertical polarization) | 37 to 40 GHz (horizontal polarization) | 37 to 40 GHz (vertical polarization) |
|---|---|---|---|---|---|
| Single | 2.5 | 1.4 | 6.4 | 6.8 | 5.2 |
| dielectric | 3 | 3.7 | 7.3 | 7.9 | 6.6 |
| material | 3.5 | 6.1 | 7.6 | 8.4 | 8.1 |
| Multiple | 2.5 | 1.7 | 6.0 | 7.4 | 6.6 |
| dielectric | 3 | 5.3 | 7.0 | 8.1 | 7.1 |
| materials | 3.5 | 7.4 | 7.0 | 8.3 | 7.3 |

Referring to Table 15, both the case in which a single dielectric material having a dielectric constant lower than the first dielectric constant is disposed in the first opening area 570 and the case in which multiple dielectric materials (e.g., the first dielectric material 1411 and the second dielectric material 1412) are disposed between the first opening area 570 and the first antenna module 346, as the height of the first opening 571 of the first opening area 570 increases, the minimum antenna grains in the first frequency band (e.g., 24 to 28.35 GHZ) and the second frequency band (e.g., 37 to 40 GHz) increase. When comparing the case in which a single dielectric material having a dielectric constant lower than the first dielectric constant is disposed in the first opening area 570 according to another embodiment and the case in which multiple dielectric materials are disposed between the first opening area 570 and the first antenna module 346, with respect to the size of the same first opening 571, the electronic device 101 has the relatively greater minimum antenna gain value in the case in which the multiple dielectric materials are disposed in the first opening area 570 than in the case in which a single dielectric material having a dielectric constant lower than the first dielectric constant is disposed. This may be attributed to the fact that since the first dielectric material 1411 is disposed in the first opening area 570, even when the ½ wavelength of an RF signal having a horizontal polarization characteristic is smaller than the height of the first opening 571, the RF signal is able to pass through the first dielectric material 1411, and as a result, the RF signal is able to be transmitted to and/or received from the exterior of the electronic device 101 by passing through the first opening 571.

The embodiment has been described with reference to the first opening 571 of the first opening area 570, this is only an example. The above description regarding the minimum antenna gain depending on a change in the height of an opening is applicable to the second opening 572, the third opening 573, the fourth opening 574, and/or the fifth opening 575.

According to various embodiments of the disclosure, an electronic device 101 may include a first frame 315*a*, a first opening 571 that is provided in one area of the first frame 315*a*, a first antenna module 346 that is disposed in the electronic device 101 to wirelessly emit a signal toward the first opening 571 in the first frame 315*a*, a first dielectric material 1411 that is disposed in the first opening 571 and having a first dielectric constant, a second dielectric material 1412 that is disposed between the first dielectric material 1411 and the first conductive patches 330, and a first wireless communication circuit 452 that is electrically connected to the first antenna module 346. The first frame 315*a* may form a first side surface 511 of the electronic device 101, the first antenna module 346 may include a first printed circuit board 410 and may include the first conductive patches 330 disposed on one surface of the first printed circuit board 410 that faces the first opening 571, and the second dielectric material 1412 may have a second dielectric constant that is lower than the first dielectric constant of the first dielectric material 1411. The first wireless communication circuit 452 may receive a signal in a frequency band of 10 GHz or higher by feeding power to the first conductive patches 330.

The electronic device 101 according to an embodiment may further include a third dielectric material 1413 having a third dielectric constant lower than the first dielectric constant of the first dielectric material 1411, wherein the third dielectric material 1413 may be disposed in the first opening 571, and may be positioned in a first direction from the first antenna module 346 toward the first opening 571 with respect to the first dielectric material 1411 disposed in the first opening 571.

According to another embodiment, the third dielectric constant of the third dielectric material 1413 may be substantially the same as the second dielectric constant of the second dielectric material 1412.

According to yet another embodiment, the third dielectric material 1413 may form the first side surface 511 together with the first frame 315*a*.

According to an embodiment, the signal in the frequency band of 10 GHz or higher that is received by the first wireless communication circuit 452 may pass through the first dielectric material 1411 and the second dielectric material 1412.

According to another embodiment, the first opening 571 may include a first edge 571*a* and a second edge 571*b* perpendicular to the first edge 571*a*, wherein the first edge 571*a* may have a first length L1, and the second edge 571*b* may have a second length L2 longer than the first length L1.

According to yet another embodiment, the signal in the frequency band of 10 GHz or higher that is received by the wireless communication circuit 452 may include a first signal having a first polarization characteristic in a first direction and a second signal having a second polarization characteristic in a second direction.

According to an embodiment, the first direction may be parallel to the first edge 571*a*, and the first length L1 of the first edge 571*a* of the first opening 571 may be shorter than a ½ wavelength of the first signal.

The electronic device 101 according to another embodiment may further include a first fixing member 602 coupled to the second dielectric material 1412, wherein the first fixing member 602 may be coupled to the first dielectric material 1411 to fix the first dielectric material 1411 to the first opening 571.

According to yet another embodiment, the first opening 571 may have a first depth, and the first dielectric material 1411 may have a thickness greater than or equal to 1/10 of the first depth.

According to an embodiment, the first opening 571 may have a rectangular shape.

According to another embodiment, the electronic device 101 may further include a second frame 315*b* that forms a second side surface 512 of the electronic device 101, a second opening area 670 that is provided in one area of the second frame 315*b*, a second antenna module 546 that is disposed in the electronic device 101 to wirelessly radiate a signal toward the second opening area 670 of the second frame 315*b*, a fourth dielectric material 1414 that is disposed in the second opening area 670 and has a fourth dielectric constant, and a fifth dielectric material 1415 that is disposed between the fourth dielectric material 1414 and the second conductive patches 530 and that has a fifth dielectric constant lower than the fourth dielectric constant of the fourth dielectric material 1414. The second antenna module 546 may include a second printed circuit board 510, and the second conductive patches 530 disposed on one surface of the second printed circuit board 510 that faces the second opening area 670, and the second wireless communication circuit 552 electrically connected to the second antenna module 546 may feed power to the second conductive patches 530.

According to yet another embodiment, the second opening area 670 may have a second depth, and the fourth dielectric material 1414 may have a thickness greater than or equal to 1/10 of the second depth.

According to an embodiment, the first dielectric constant of the first dielectric material 1411 may have a value between 5.5 and 10.

According to another embodiment, the second dielectric constant of the second dielectric material 1412 may have a value between 2 and 4.

According to various embodiments of the disclosure, an electronic device 101 may include a first frame 315*a*, a first opening 571 that is provided in one area of the first frame 315*a*, a first antenna module 346 that is disposed in the electronic device 101 to wirelessly emit a signal toward the first opening 571 in the first frame 315*a*, a first dielectric material 1411 that is disposed in the first opening 571 and has a first dielectric constant, a second dielectric material 1412 that is disposed between the first dielectric material 1411 and the first conductive patches 330, a third dielectric material 1413 that has a third dielectric constant lower than the first dielectric constant of the first dielectric material 1411, and a first wireless communication circuit 452 that is electrically connected to the first antenna module 346. The first frame 315*a* may form a first side surface 511 of the electronic device 101, the first antenna module 346 may include a first printed circuit board 410, the first conductive patches 330 disposed on one surface of the first printed circuit board 410 that faces the first opening 571, the second dielectric material 1412 may have a second dielectric constant that is lower than the first dielectric constant of the first dielectric material 1411, and the third dielectric material 1413 may be disposed in the first opening 571, and may be positioned in a first direction from the first antenna module 346 toward the first opening 571 with respect to the first dielectric material 1411 disposed in the first opening 571. The first wireless communication circuit 452 may receive a signal in a frequency band of 10 GHz or higher by feeding power to the first conductive patches 330.

According to an embodiment, the signal in the frequency band of 10 GHz or higher that is received by the first wireless communication circuit 452 may pass through the first dielectric material 1411, the second dielectric material 1412, and the second dielectric material 1413.

According to another embodiment, the first opening 571 may include a first edge 571*a* and a second edge 571*b* perpendicular to the first edge 571*a*, wherein the first edge 571*a* may have a first length L1, and the second edge 571*b* may have a second length L2 longer than the first length L1.

According to yet another embodiment, the signal in the frequency band of 10 GHz or higher that is received by the wireless communication circuit 452 may include a first signal having a first polarization characteristic parallel to the first edge 571*a*, and the first length L1 of the first edge 571*a* of the first opening 571 may be shorter than a ½ wavelength of a wavelength of the first signal.

According to an embodiment, the first opening area 571 may have a first depth, and the first dielectric material 1411 may have a thickness greater than or equal to 1/10 of the first depth.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:

a first frame including a recess portion including at least one opening, and forming at least part of a first side surface of the electronic device, wherein the recess portion has a first depth and the at least one opening has a second depth;

a first antenna module including a first printed circuit board and a first set of conductive patches, wherein the first antenna module is accommodated in the electronic device such that at least one of the first set of the conductive patches radiates signals toward the at least one opening;

a first dielectric member having a first dielectric constant and disposed in the recess portion having the first depth and the at least one opening having the second depth;

a second dielectric member having a second dielectric constant lower than the first dielectric constant, and disposed between the first dielectric member and the first set of the conductive patches; and a wireless communication circuit configured to feed power to the first set of the conductive patches to transmit the signals of a specified frequency band via the second dielectric member, the first dielectric member, and the at least one opening.

2. The electronic device of claim 1, further comprising:

a third dielectric member having a third dielectric constant lower than the first dielectric constant, wherein the third dielectric member is disposed in the recess portion and outside the first dielectric member.

3. The electronic device of claim 1, wherein a height of a first opening among the at least one opening is larger than a depth of the first opening.

4. The electronic device of claim 1, wherein a height of a first opening among the at least one opening is smaller than a depth of the first opening.

5. The electronic device of claim 1, wherein a height of a first opening among the at least one opening is substantially same as a depth of the first opening.

6. The electronic device of claim 1, wherein a height of a first opening among the at least one opening is smaller than a ½ wavelength of the specified frequency band.

7. The electronic device of claim 6, wherein the specified frequency band is 10 gigahertz or higher.

8. The electronic device of claim 1, further comprising:

a second frame including a second opening and forming at least part of a second side surface of the electronic device, wherein the second opening has a third depth;

a second antenna module including a second printed circuit board and a second set of conductive patches, wherein the second antenna module is accommodated in the electronic device such that at least one of the second set of the conductive patches radiates a signal toward the second opening;

a third dielectric member having a third dielectric constant and disposed in the second opening; and a fourth dielectric member having a fourth dielectric constant lower than the third dielectric constant, and disposed between the third dielectric member and the second set of the conductive patches, wherein the fourth dielectric member is spaced apart from the second set of the conductive patches by an air gap.

9. The electronic device of claim 8, wherein the wireless communication circuit is configured to feed power to the second set of the conductive patches to transmit the signal of the specified frequency band via the fourth dielectric member, the third dielectric member, and the second opening.

10. The electronic device of claim 1, wherein the at least one opening includes a plurality of openings, and wherein each of the plurality of openings corresponds to each of the first set of the conductive patches.

11. An electronic device comprising:

a first frame including a recess portion including at least one opening and forming at least part of a first side surface of the electronic device, wherein the recess portion has a first depth and the at least one opening has a second depth;

a first antenna module including a first printed circuit board and a first set of conductive patches, wherein the first antenna module is accommodated in the electronic device such that at least one of the first set of the conductive patches radiates signals toward the at least one opening;

a first dielectric member having a first dielectric constant and disposed in the recess portion having the first depth and the at least one opening having the second depth;

a second dielectric member having a second dielectric constant lower than the first dielectric constant, and disposed between the first dielectric member and the first set of the conductive patches, wherein the second dielectric member is spaced apart from the first set of the conductive patches by an air gap; and a wireless communication circuit configured to transmit, using the first set of the conductive patches, the signals of a specified frequency band via the second dielectric member, the first dielectric member, and the at least one opening.

12. The electronic device of claim 11, further comprising:

a third dielectric member having a third dielectric constant lower than the first dielectric constant, wherein the third dielectric member is disposed in the recess portion and outside the first dielectric member.

13. The electronic device of claim 11, wherein a height of a first opening among the at least one opening is larger than a depth of the first opening.

14. The electronic device of claim 11, wherein a height of a first opening among the at least one opening is smaller than a depth of the first opening.

15. The electronic device of claim 11, wherein a height of a first opening among the at least one opening is substantially same as a depth of the first opening.

16. The electronic device of claim 11, wherein a height of a first opening among the at least one opening is smaller than a ½ wavelength of the specified frequency band.

17. The electronic device of claim 16, wherein the specified frequency band is 10 gigahertz or higher.

18. The electronic device of claim 11, further comprising:

a second frame including a second opening and forming at least part of a second side surface of the electronic device, wherein the second opening has a third depth;

a second antenna module including a second printed circuit board and a second set of conductive patches, wherein the second antenna module is accommodated in the electronic device such that at least one of the second set of the conductive patches radiates a signal toward the second opening;

a third dielectric member having a third dielectric constant and disposed in the second opening; and a fourth dielectric member having a fourth dielectric constant lower than the third dielectric constant, and disposed between the third dielectric member and the second set of the conductive patches, wherein the fourth dielectric member is spaced apart from the second set of the conductive patches by an air gap.

19. The electronic device of claim 18, wherein the wireless communication circuit is configured to feed power to the second set of the conductive patches to transmit the signal of the specified frequency band via the fourth dielectric member, the third dielectric member, and the second opening.

20. The electronic device of claim 11, wherein the at least one opening includes a plurality of openings, and wherein each of the plurality of openings corresponds to each of the first set of the conductive patches.

* * * * *